US012732652B2

(12) United States Patent
Park et al.

(10) Patent No.: US 12,732,652 B2
(45) Date of Patent: Sep. 8, 2026

(54) MEDIA DATA PROCESSING METHOD AND MEDIA DATA PROCESSING DEVICE

(71) Applicant: LG ELECTRONICS INC., Seoul (KR)

(72) Inventors: Jonghwan Park, Seoul (KR); Joonhee Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/869,180

(22) PCT Filed: May 26, 2023

(86) PCT No.: PCT/KR2023/007277
§ 371 (c)(1),
(2) Date: Nov. 25, 2024

(87) PCT Pub. No.: WO2023/229425
PCT Pub. Date: Nov. 30, 2023

(65) Prior Publication Data

US 2025/0350780 A1 Nov. 13, 2025

(30) Foreign Application Priority Data

May 26, 2022 (KR) ........................ 10-2022-0064609
Jun. 3, 2022 (KR) ........................ 10-2022-0068392

(51) Int. Cl.
*H04N 21/2362* (2011.01)

(52) U.S. Cl.
CPC ............................... *H04N 21/2362* (2013.01)

(58) Field of Classification Search
None
See application file for complete search history.

(56) References Cited

U.S. PATENT DOCUMENTS

| | | | |
|---|---|---|---|
| 2007/0261078 A1 | 11/2007 | Hwang | |
| 2008/0168511 A1 | 7/2008 | Kim et al. | |
| 2018/0007401 A1 | 1/2018 | Burckard | |

FOREIGN PATENT DOCUMENTS

| | | |
|---|---|---|
| EP | 2210359 B1 | 3/2014 |
| EP | 4167578 A1 | 4/2023 |
| EP | 4207776 A1 | 7/2023 |

OTHER PUBLICATIONS

Digital Video Broadcasting (DVB); Service Discovery and Programme Metadata for DVI-I, ETSI TS 103 770 V1.1.1 Nov. 2020. Provided on IDS filed Feb. 26, 2025. (Year: 2020).*

(Continued)

*Primary Examiner* — Junior O Mendoza

(74) *Attorney, Agent, or Firm* — Bryan Cave Leighton Paisner LLP

(57) ABSTRACT

A media data processing method according to embodiments may comprise the steps of: generating media data; generating a service list for the media data; and transmitting the media data and the service list on the basis of a network. A media data processing method according to embodiments may comprise the steps of: receiving media data and a service list for the media data on the basis of a network; and processing the media data on the basis of the service list.

11 Claims, 37 Drawing Sheets

(56) References Cited

OTHER PUBLICATIONS

"Digital Video Broadcasting (DVB); Service Discovery and Programme Metadata for DVB-I," ETSI TS 103 770 V1.1.1 (Nov. 2020), 650 Route des Lucioles, F-06921 Sophia Antipolis Cedex—France, pp. 1-189.
Higgs, et al. "MT-10148 Service List Logo in SLR," DVB Digital Video Broadcasting, No. 0, May 2022, 6 pages, XP017863312.

* cited by examiner

FIG. 4a

[DVBiServiceListType]

```
<element name="ServiceList" type="dvbisd:DVBiServiceListType"/>
<complexType name="DVBiServiceListType">
        <sequence>
                <element name="Name" type="mpeg7:TextualType" maxOccurs="unbounded"/>
                <element name="ProviderName" type=" mpeg7:TextualType " maxOccurs="unbounded"/>
                <element name="RelatedMaterial" type="tva:RelatedMaterialType" minOccurs="0" maxOccurs="unbounded"/>
                <element name="RegionList" type="dvbisd:RegionListType" minOccurs="0"/>
                <element name="TargetRegion" type="dvbisd:RegionIdRefType" minOccurs="0" maxOccurs="unbounded"/>
                <element name="LCNTableList" type="dvbisd:LCNTableListType" minOccurs="0"/>
                <element name="Service" type="dvbisd:DVBiServiceType" minOccurs="0" maxOccurs="unbounded"/>
                <any namespace="##other" processContents="lax" minOccurs="0" maxOccurs="unbounded"/>
        </sequence>
        <attribute name="version" type="positiveInteger" use="required"/>
</complexType>
```

FIG. 4b

| Name | Semantic Definition | Constraints |
|---|---|---|
| ServiceList | A list of the details and locations of IP services offered by the service provider. A service provider can divide their services into multiple service lists for administrative convenience. | Mandatory |
| Name | The name of this service list in a human readable form. Multiple service list names can be specified as long as they have different xml:lang values. | Mandatory<br>1 ..∞ |
| ProviderName | The name of the provider of this service list in a human readable form. Multiple values for the provider name can be specified as long as they have different xml:lang values. | Mandatory<br>1 ..∞ |
| RelatedMaterial | Additional material related to the service. Use to signal the following<br>· Service list logos, see clause 5.2.5.1 | Optional<br>0 ..∞ |
| RegionList | A list of geographic regions with logical identifiers that are used to provide regionalization of the service list or services in the service list. | Optional |
| TargetRegion | The identifiers of those regions specified in the RegionList for which this service list is targeted. | Optional<br>0 ..∞ |
| LCNTableList | The list of tables that define regionalized and packaged logical channel numbers for the services in this service list. | Optional |
| Service | The services that are part of this service list. | Optional<br>0 ..∞ |
| @version | The version number of the service list. Must be incremented for every published change. | Mandatory |

FIG. 5a

[DVBiServiceType]

```
<complexType name="DVBiServiceType">
    <sequence>
        <element name="UniqueIdentifier" type="dvbisd:ServiceIdentifierType"/>
        <element name="ServiceInstance" type="dvbisd:ServiceInstanceType" minOccurs="0" maxOccurs="unbounded"/>
        <element name="TargetRegion" type="dvbisd:RegionIdRefType" minOccurs="0" maxOccurs="unbounded"/>
        <element name="ServiceName" type="mpeg7:TextualType" maxOccurs="unbounded"/>
        <element name="ProviderName" type="mpeg7:TextualType" maxOccurs="unbounded"/>
        <element name="RelatedMaterial" type="tva:RelatedMaterialType" minOccurs="0" maxOccurs="unbounded "/>
        <element name="ServiceGenre" type="dvbisd-base:Genre" minOccurs="0"/>
        <element name="ServiceType" type="dvbisd-base:ServiceType" minOccurs="0"/>
        <element name="RecordingInfo" type="tva:ControlledTermType" minOccurs="0"/>
        <element name="GuideSource" type="dvbisd-base:BCGOffering" minOccurs="0"/>
    </sequence>
    <attribute name="version" type="positiveInteger" use="required"/>
</complexType>
```

FIG. 5b

| Name | Semantic Definition | Constraints |
|---|---|---|
| ServiceList | A list of the details and locations of IP services offered by the service provider. A service provider can divide their services into multiple service lists for administrative convenience. | Mandatory |
| Name | The name of this service list in a human readable form. Multiple service list names can be specified as long as they have different xml:lang values. | Mandatory<br>1 ..∞ |
| ProviderName | The name of the provider of this service list in a human readable form. Multiple values for the provider name can be specified as long as they have different xml:lang values. | Mandatory<br>1 ..∞ |
| RelatedMaterial | Additional material related to the service. Use to signal the following<br>· Service list logos, see clause 5.2.5.1 | Optional<br>0 ..∞ |
| RegionList | A list of geographic regions with logical identifiers that are used to provide regionalization of the service list or services in the service list. | Optional |
| TargetRegion | The identifiers of those regions specified in the RegionList for which this service list is targeted. | Optional<br>0 ..∞ |
| LCNTableList | The list of tables that define regionalized and packaged logical channel numbers for the services in this service list. | Optional |
| Service | The services that are part of this service list. | Optional<br>0 ..∞ |
| @version | The version number of the service list. Must be incremented for every published change. | Mandatory |

FIG. 6a

[ServiceInstanceType]

```
<complexType name="ServiceInstanceType">
    <sequence>
        <element name="DisplayName" type="mpeg7:TextualType" minOccurs="0" maxOccurs="unbounded"/>
        <element name="RelatedMaterial" type="tva:RelatedMaterialType" minOccurs="0" maxOccurs="unbounded"/>
        <element name="DRMSystemId" type="string" minOccurs="0"     maxOccurs="unbounded"/>
        <element name="ContentAttributes" type="dvbisd-base:ContentAttributesType" minOccurs="0"/>
        <element name="Availability" type="dvbisd-base:ServiceAvailabilityType" minOccurs="0"/>
        <element name="SubscriptionPackage" type="string" minOccurs="0" maxOccurs="unbounded"/>
        <element name="FTAContentManagement" type="dvbisd:FTAContentManagementType" minOccurs="0"/>
        <element name="SourceType" type="anyURI"/>
        <choice minOccurs="0" maxOccurs="unbounded">
            <element name="DVBTDeliveryParameters" type="dvbisd:DVBTDeliveryParametersType"/>
            <sequence>
                <element name="DVBSDeliveryParameters" type="dvbisd:DVBSDeliveryParametersType"/>
                <element name="SATIPDeliveryParameters" type="dvbisd:SATIPDeliveryParametersType" minOccurs="0"/>
            </sequence>
            <element name="DVBCDeliveryParameters" type="dvbisd:DVBCDeliveryParametersType"/>
            <element name="RTSPDeliveryParameters" type="dvbisd:RTSPDeliveryParametersType"/>
            <element name="MulticastTSDeliveryParameters" type="dvbisd:MulticastTSDeliveryParametersType"/>
            <sequence>
                <element name="DASHDeliveryParameters" type="dvbisd:DASHDeliveryParametersType"/>
                <element name="MulticastTSDeliveryParameters" type="dvbisd:MulticastTSDeliveryParametersType"
                    minOccurs="0"/>/>
            </sequence>
            <any namespace="##other" processContents="lax"/>
        </choice>
    </sequence>
    <attribute name="priority" type="integer" default="0"/>
</complexType>
```

FIG. 6b

| Name | Semantic Definition | Constraints |
|---|---|---|
| DisplayName | Human-readable name of the service associated to this specific Service Location. Multiple service names may be provided as long as they all have different xml:lang attributes. When not present, ServiceName is used. | Optional<br>0..∞ |
| RelatedMaterial | Additional material related to the service. Use to signal the following<br>• Out of service banners, see clause 5.2.4.3<br>• Service related applications, see clause 5.2.3<br>• Service logos, see clause 5.2.5.2<br>Any related material with a particular value of HowRelated that is provided within a ServiceInstance element supersedes any corresponding related material with that value of HowRelated that is provided within a Service element. | Optional<br>0..∞ |
| DRMSystemId | Denotes any content protection schemes being used for this service. The value shall be the same as the @schemeIdURI defined in clause 8.4 of DVB A168 [10] | Optional<br>0..∞ |
| ContentAttributes | Refer to Annex D.1.3.2 of ETSI TS 103 205 [2] for semantic definition. | Optional<br>0..1 |
| Availability | Indicates the period(s) in time when this service location is expected to be active. | Optional<br>0..1 |
| SubscriptionPackage | Identifies the subscription packages in which this service is included. | Optional<br>0..∞ |
| FTAContentManagement | DVB-I service instances not using DRM may carry a FTAContentManagement element to define the content management policy for the ServiceInstance. The semantics of each attribute are those defined for the correspondingly named fields of the FTA_content_management_descriptor defined in clause 6.2.18.0 of ETSI EN 300 468 [6]. | Optional<br>0..1 |
| | | |

FIG. 6c

| | | |
|---|---|---|
| SourceType | Identifies the primary delivery source for this service instance and thus determines the required delivery parameters according to Table 13. | Optional 0..1 |
| DVBTDeliveryParameters | Delivery parameters for DVB-T services. | To be specified in accordance with SourceType as described in Table 13. |
| DVBSDeliveryParameters | Delivery parameters for DVB-S services. | |
| DVBCDeliveryParameters | Delivery parameters for DVB-C services. | |
| RTSPDeliveryParameters | Delivery parameters for RTSP based services. | |
| MulticastTSDeliveryParameters | Delivery parameters for services delivered using multicast UDP. | |
| DASHDeliveryParameters | Delivery parameters for services using DVB DASH [10] delivery. | |
| SATIPDeliveryParameters | Provides parameters that a DVB-I client supporting SAT>IP as a "thin client" can use to receive the service instance from a SAT>IP server. | |
| @priority | The priority of this service instance relative to the other services instances of the service. | Optional |

FIG. 7

```
[DASHDeliveryParameters]
    <complexType name="DASHDeliveryParametersType">
        <sequence>
            <element name="UriBasedLocation" type="dvbisd-base:dvbExtendedURIType" maxOccurs="unbounded"/>
            <element name="MinimumBitRate" type="unsignedInt" minOccurs="0"/>
        </sequence>
    </complexType>
```

| Name | Semantic Definition | Constraints |
|---|---|---|
| UriBasedLocation | Refer to Annex D.1.3.2 of ETSI TS 103 205 [2] for semantic definition. | Mandatory<br>1..∞ |
| MinimumBitRate | Threshold bit-rate under which an alternative source for the same service should be preferred, if available. | Optional |

FIG. 8

```xml
<option 1>
    <complexType name="DASHDeliveryParametersType">
        <sequence>
            <element name="UriBasedLocation" type="dvbisd-base:dvbExtendedURIType" maxOccurs="unbounded"/>
            <element name="MinimumBitRate" type="unsignedInt" minOccurs="0"/>
            <element name="ComparisonBitRate" type="unsignedInt" minOccurs="0"/>
            <element name=" ComparisonContentAttributeType " type="dvbisd-base:ContentAttributesType" minOccurs="0"/>
        </sequence>
    </complexType>
    <complexType name=" ComparisonContentAttributeType ">
        <sequence>
            <element name="AudioAttributes" type="tva:AudioAttributesType" minOccurs="0" maxOccurs="unbounded"/>
            <element name="VideoAttributes " type="tva:VudioAttributesType" minOccurs="0" maxOccurs="unbounded"/>
            <element name="CaptionLanguage" type="tva:CaptionLanguageType" minOccurs="0" maxOccurs="unbounded"/>
            <element name="SignLanguage" type="tva:SignLanguageType" minOccurs="0" maxOccurs="unbounded"/>
        </sequence>
    </complexType>
<option 2>
    <complexType name="DASHDeliveryParametersType">
        <sequence>
            <element name="UriBasedLocation" type="dvbisd-base:dvbExtendedURIType" maxOccurs="unbounded"/>
            <element name="MinimumBitRate" type="unsignedInt" minOccurs="0"/>
            <element name=" ComparisonContentAttributeType " type="dvbisd-base:ContentAttributesType" minOccurs="0"/>
        </sequence>
    </complexType>
    <complexType name=" ComparisonContentAttributeType ">
        <sequence>
            <element name="AudioAttributes" type="tva:AudioAttributesType" minOccurs="0" maxOccurs="unbounded"/>
            <element name="VideoAttributes " type="tva:VudioAttributesType" minOccurs="0" maxOccurs="unbounded"/>
            <element name="CaptionLanguage" type="tva:CaptionLanguageType" minOccurs="0" maxOccurs="unbounded"/>
            <element name="SignLanguage" type="tva:SignLanguageType" minOccurs="0" maxOccurs="unbounded"/>
            <element name="ComparisonBitRate" type="unsignedInt" minOccurs="0"/>
        </sequence>
    </complexType>
```

FIG. 9

```
<ServiceInstance priority="0">
    <DisplayName> ABC drama </DisplayName>
    <ContentAttributes>
      <dvbisd-base:AudioAttributes>
        <tva:Coding href="urn:mpeg:mpeg7:cs:AudioCodingFormatCS:2001:3.2">
          <tva:Name>MPEG-1 Audio Layer II</tva:Name>
        </tva:Coding>
      </dvbisd-base:AudioAttributes>
      <dvbisd-base:AudioAttributes>
        <tva:Coding href="urn:dvb:metadata:cs:AudioCodecCS:2007:3.1">
          <tva:Name>AC3</tva:Name>
        </tva:Coding>
      </dvbisd-base:AudioAttributes>
      <dvbisd-base:VideoAttributes>
        <tva:Coding href="urn:mpeg:mpeg7:cs:VideoCodingFormatCS:2001:2.2.2">
          <tva:Name>MPEG-2 Video Main Profile @ Main Level</tva:Name>
        </tva:Coding>
      </dvbisd-base:VideoAttributes>
    </ContentAttributes>
    <SourceType>urn:dvb:source:dvb-s</SourceType>
    <DVBSDeliveryParameters>
      <DVBTriplet origNetId="1" tsId="1101" serviceId="28106"/>
      <OrbitalPosition>19.2</OrbitalPosition>
      <Frequency>1183600</Frequency>
      <Polarization>horizontal</Polarization>
    </DVBSDeliveryParameters>
  </ServiceInstance>
```

56000

```
<ServiceInstance priority="1">
    <DisplayName> ABC drama </DisplayName>
    <SourceType>urn:dvb:source:dvb-dash</SourceType>
    <DASHDeliveryParameters>
      <UriBasedLocation contentType="application/dash+xml">
        <dvbisd-base:URI>https://live.daserste.de/0001 Das%20Erste.mpd</dvbisd-base:URI>
      </UriBasedLocation>
      <MinimumBitrate> 1M </MinimumBitrate>
      <ComparisonBitRate> 7M </ComparisonBitRate>
      <ComparisonContentAttribute>
        <dvbisd-base:VideoAttributes>
          <tva:Coding href="urn:mpeg:mpeg7:cs:VideoCodingFormatCS:2001:2.2.2">
            <tva:Name>HEVC Video Main10 Profile @ Main Level</tva:Name> : UHD enable
          </tva:Coding>
        </dvbisd-base:VideoAttributes>
      </ComparisonContentAttribute>
    </DASHDeliveryParameters>
  </ServiceInstance>
```

```
<?xml version="1.0" encoding="UTF-8"?>
<schema xmlns="http://www.w3.org/2001/XMLSchema" xmlns:dvbisld="urn:dvb:metadata:
servicelistdiscovery:2020" xmlns:mpeg7="urn:tva:mpeg7:2008" xmlns:tva="urn:tva:metadata:2019"
xmlns:dvbisd="urn:dvb:metadata:servicediscovery:2020" targetNamespace="urn:dvb:metadata:
servicelistdiscovery:2020" elementFormDefault="qualified" attributeFormDefault="unqualified">
    <import namespace="urn:tva:metadata:2019" schemaLocation="tva_metadata_3-1.xsd"/>
    <import namespace="urn:tva:mpeg7:2008" schemaLocation="tva_mpeg7.xsd"/>
    <import namespace="urn:dvb:metadata:servicediscovery:2020" schemaLocation=
    "dvbi_v2.0.xsd"/>
    <element name="ServiceListEntryPoints" type="dvbisld:ServiceListEntryPointsType"/>
    <complexType name="ServiceListEntryPointsType">
        <sequence>
            <element name="ServiceListRegistryEntity" type="dvbisld:
            OrganizationType"/>
            <element name="ProviderOffering" type="dvbisld:ProviderOfferingType"
            minOccurs="0" maxOccurs="unbounded"/>
            <element name="Extension" type="dvbisd:ExtensionBaseType" minOccurs="0"
            maxOccurs="unbounded"/>
        </sequence>
    </complexType>
```

FIG. 14

| | Semantic Definition | Constraints |
|---|---|---|
| OSName | Supportable OS version and name | |
| ServiceCode | Supportable service code within the device | |
| TargetLocation2 | A target location where the device is made, e.g., UK, Nordic | |
| Sourcelocation | A location of a streaming server that provides each service | |
| PublishedDate | Service list publish data | |
| ReleasedDate | Service list release data | |
| Manufacturer | A service list implementation company | |
| ManufacturerURL | URL of the service list implementation company | |
| ServiceDescription | A brief description of the service list. e.g. List indicating text | |
| ServiceReport | A service list issue or consumption report | |

<FirmwareUpgrade>

| | Semantic Definition | Constraints |
|---|---|---|
| Version | Firmware version number that the platform should support | |
| UpdateLocationURL | URL accessible for firmware update | |

<ServiceAvailability>

| | Semantic Definition | Constraints |
|---|---|---|
| Version | Current version in which the service list is provided | |
| ServiceAvailability SearchURL | URL for moving to a web page where service search is available such that additional services provided by the service list provider may be added | |
| ServiceAvailability DBUpdateURL | Link URL for service data base update. Schema to support XML update based on IETF RFC 5261 is downloaded, and fetching may be performed through the corresponding information. | |

FIG. 15a

```
<?xml version="1.0" encoding="UTF-8"?>
<!DOCTYPE xml>
<!-- Example of ServiceListEntryPoint published by a DVB-mfr Servicelist Server -->
<ServiceListEntryPoints xmlns="urn:dvb:metadata:servicelistdiscovery:2020" xmlns:xsi=
"http://www.w3.org/2001/XMLSchema-instance"xsi:schemaLocation="urn:dvb:metadata:dvbmfr-
extensions:2020 ../dvbmfr_extensions_v1.0.xsd" xsi:dvbmfr="urn:dvb:metadata:dvbmfr-extensions:
2020"xmlns:dvbisd="urn:dvb:metadata:servicediscovery:2020" xmlns:tva="urn:tva:metadata:2019">
       //DVB-I discovery scheme compatible
       <ServiceListRegistryEntity>
    <Name>DVB-I Manufacturer Server Registry</Name>
  </ServiceListRegistryEntity>
  <ProviderOffering>
    <Provider>
      <Name>DVB-I Manufacturer Server #1</Name>
    </Provider>
    <ServiceListOffering>
      <ServiceListName>LG channels </ServiceListName>
      <ServiceListURI contentType="application/xml">
        <dvbisd:URI>https://www.LgChannels/dvbmfr/UK/servicelist.xml</dvbisd:URI>
      </ServiceListURI>
                    <Language> Eng </Language>
                    <TargetCountry> UK </TargetCountry>
    </ServiceListOffering>
  </ProviderOffering>

       <!--Properties for checking whether a list is receivable -->
  <Extension xmlns:dvbmfr="urn:dvb:metadata:dvbmfr-extensions:2020" xsi:type="dvbmfrx:
  mfrServiceListEntryPointsType" extensionName="DVB-I mfr">
    <dvbmfr:mfrServiceListRegistryEntity specVersion="1">

                    //addtional information for mfrs
                    <dvbmfr:OSName> webOS 4.5 </dvbmfr:OSName>
                    <dvbmfr:ServiceCode> 55UM7811C3NA.AKRYLH </dvbmfr:ServiceCode>
                    <dvbmfr:TargetLocation> UK enable </dvbmfr:TargetLocation>
                    <dvbmfr:Sourcelocation> UK WeyBridge </dvbmfr:Sourcelocation>
                    <dvbmfr:PublishedDate> 2020.2 </dvbmfr:PublishedDate>
                    <dvbmfr:ReleasedDate> 2019.11 </dvbmfr:ReleasedDate>
                    <dvbmfr:Manufacturer>LG Electronics</dvbmfr:Manufacturer>
                    <dvbmfr:ManufacturerURL> https://www.lge.com </dvbmfr:
                    ManufacturerURL>
                    <dvbmfr:ServiceDescription> LG channels Dec 2019 version </dvbmfr:
                    ServiceDescription>
```

FIG. 15b

```
        <dvbmfr:FirmwareUpgrade>
            <dvbmfr:Version>1.1</dvbmfr:Version>
            <dvbmfr:UpdateLocationURL contentType="application/xml">
                <dvbisdURL>https://www.LgChannels/FirmwareUpgrade/
                upgrade.xml </dvbisd:URI>
            </dvbmfr:UpdateLocationURL>
        </dvbmfr:FirmwareUpgrade>
        <dvbmfr:ServiceAvailability>
  <dvbmfr:Version>1</dvbmfr:Version>
  <dvbmfr:ServiceAvailabilitySearchURL contentType="application/xml">
      <dvbisdURL>https://www.LgChannels/dvbmfr/ServiceSearchURL.html </dvbisd:URI>
  </dvbmfr:ServiceAvailabilityMapIdleURL>
  <dvbmfr:ServiceAvailabilityDBUpdateURL contentType="application/xml">
      <dvbisdURL>https://www.LgChannels/dvbmfr/ServiceAvailabilityMapUdpade.xml
      </dvbisd:URI>
  </dvbmfr:ServiceAvailabilityDBUpdateURL>
 </dvbmfr:ServiceAvailability>
        <dvbmfr:ServiceReport> https://my.lgChannels.com/ServiceReport/list/main
        </dvbmfr:ServiceReport>

      </dvbmfr:mfrServiceListRegistryEntity>
</Extension>
</ServiceListEntryPoints>
```

FIG. 17

[Use case 1 occurring when multiple service lists are aggregated]

| Service list | Service ID | LCN | Legacy | Content |
|---|---|---|---|---|
| List Provider name A | Sid = s01 | 13 | 13 | News |
| List Provider name B | Sid = s01 | 13 | 13 | News |
| List Provider name C | Sid = s02 | 14 | 14 | Drama |
| List Provider name D | Sid = s05 | 15 | 15 | TV show |

[Use case 2 occurring when multiple service lists are aggregated]

| Service list | Service ID | LCN | Legacy | Content |
|---|---|---|---|---|
| List Provider name A | Sid = s01 | 10 | 10 | News |
| List Provider name B | Sid = s03 | 10 | | Drama channel |

[Use case 3 occurring when multiple service lists are aggregated]

| Service list | Service ID | LCN | Legacy | Content |
|---|---|---|---|---|
| DVB-T | Sid = s01 | 10 | 10 | Movie |
| List Provider name A | Sid = s03 | 10 | 10 | Movie |
| List Provider name B | Sid = s13 | 10 | - | News |

[Use case 4 occurring when multiple service lists are aggregated]

| Service list | Service ID | LCN | Legacy | Content |
|---|---|---|---|---|
| List Provider name A | Sid = s01 | 9 | 9 | BBC News |
| List Provider name B | Sid = s20 | 9 | 9 | KBS News |

FIG. 19a

```
<complexType name="LCNTableType">
        <sequence>
            <element name="TargetRegion" type="dvbisd:RegionIdRefType" minOccurs="0" maxOccurs="unbounded"/>
            <element name="SubscriptionPackage" type="dvbisd:SubscriptionPackageType" minOccurs="0" maxOccurs="unbounded"/>
            <element name="LCN" type="dvbisd:LCNTableEntryType" minOccurs="0" maxOccurs="unbounded"/>
        <!-- An extension for channel collision -->
            <element name="SecondaryChannelNumberRange" type="SecondaryChannelNumberRangeType" use="optional"/>
        <!-- An extension for channel collision -->
        </sequence>
    </complexType>
    <complexType name="LCNTableEntryType">
        <attribute name="channelNumber" type="positiveInteger" use="required"/>
    <!-- An extension for channel collision -->
        <attribute name="minorChannelNumber" type="positiveInteger" use="optional"/>
        <attribute name="FlexibleNumber" type="boolean" default="true"/>  //false :List provider based channel number used to
        show different lists for the same channel
        <attribute name="FavoriteChannelNumber" type="positiveInteger" use="optional"/>
    <!-- An extension for channel collision -->
        <attribute name="serviceRef" type="dvbisd:ServiceIdentifierType" use="required"/>
        <attribute name="selectable" type="boolean" default="true"/>
        <attribute name="visible" type="boolean" default="true"/>
    </complexType>
    .<!-- An extension for channel collision -->
    <complexType name="FavoriteChannelNumberRangeType">
            <sequence>
                <attribute name="from" type="positiveInteger" use="optional"/>
                <attribute name="to" type="positiveInteger" use="optional"/>
            </sequence>
    </complexType>
    <!-- An extension for channel collision -->
```

FIG. 19b

| | Semantic Definition | Constraints |
|---|---|---|
| MinorChannelNumber | Allocating minor channels of LCN channel, e.g., 7-1 and 100-1 | |
| FlexibleNumber | In the setting mode, the channel banner shows the existing channel number and identifies it with the name of the service list provider.. e.g.) Different service provider names and text colors | |
| FavoriteChannel Number | Preferred channel number in addition to the defined channel Number when a conflict occurs | |
| SecondaryChannel NumberRange | SecondaryChannelNumberRange range, which allows LCN allocation to be performed in the range in case of conflict | |

FIG. 20

```
<LCNTableList>
  <LCNTable>
    <LCN channelNumber="0"  serviceRef="s1"/>
    <LCN channelNumber="2"  serviceRef="s2"/>
    <LCN channelNumber="14"  serviceRef="s3"/>
    <LCN channelNumber="16"  serviceRef="s4"/>
    <LCN channelNumber="20"  serviceRef="s5"/>
    <LCN channelNumber="21"  serviceRef="s6"/>
    <LCN channelNumber="34"  serviceRef="s7"/>
  </LCNTable>
</LCNTableList>
```

<Service list 1>

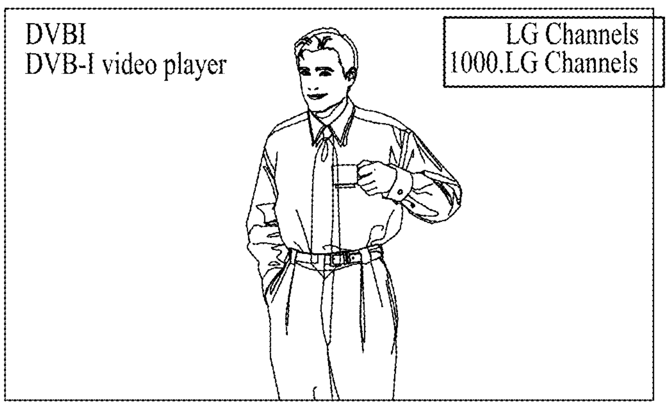

```
<LCNTableList>
  <LCNTable>
    <LCN channelNumber="647"  serviceRef="sid1"/>
    <LCN channelNumber="11"  serviceRef="sid2"/>
    <LCN channelNumber="4"  serviceRef="sid3"/>
    <LCN channelNumber="3"  serviceRef="sid4"/>
    <LCN channelNumber="8"  serviceRef="sid5"/>
    <LCN channelNumber="12"  serviceRef="sid6"/>
    <LCN channelNumber="34"  serviceRef="sid7"/>
    <LCN channelNumber="324"  serviceRef="sid8"/>
    <LCN channelNumber="642"  serviceRef="sid8"/>
    <LCN channelNumber="640"  serviceRef="sid10"/>
    <LCN channelNumber="641"  serviceRef="sid11"/>
    <LCN channelNumber="643"  serviceRef="sid12"/>
    <LCN channelNumber="644"  serviceRef="sid13"/>
    <LCN channelNumber="645"  serviceRef="sid14"/>
    <LCN channelNumber="1001"  serviceRef="sid15"/>
    <LCN channelNumber="1002"  serviceRef="sid16"/>
    <LCN channelNumber="1003"  serviceRef="sid17"/>
    <LCN channelNumber="1004"  serviceRef="sid18"/>
    <LCN channelNumber="1005"  serviceRef="sid19"/>
    <LCN channelNumber="1006"  serviceRef="sid20"/>
    <LCN channelNumber="1007"  serviceRef="sid21"/>
    <LCN channelNumber="1008"  serviceRef="sid22"/>
    <LCN channelNumber="0"  serviceRef="sid23" FavoriteChannelNumber="1000"/>
  </LCNTable>
</LCNTableList>
```

<Service list 2>

FIG. 21a

```
<LCNTableList>
  <LCNTable>
    <LCN channelNumber="100" serviceRef="s1"/>
    <LCN channelNumber="101" serviceRef="s2"/>
    <LCN channelNumber="102" serviceRef="s3"/>
    <LCN channelNumber="103" serviceRef="s4"/>
    <LCN channelNumber="104" serviceRef="s5"/>
    <LCN channelNumber="105" serviceRef="s6"/>
    <LCN channelNumber="106" serviceRef="s7"/>
  </LCNTable>
</LCNTableList>
```

<Service list 1>

```
<LCNTableList>
  <LCNTable>
    <SecondaryChannelNumberRange From="1000" To="1100"/>
    <LCN channelNumber="647" serviceRef="s1"/>
    <LCN channelNumber="11" serviceRef="s2"/>
    <LCN channelNumber="4" serviceRef="s3"/>
    <LCN channelNumber="3" serviceRef="s4"/>
    <LCN channelNumber="8" serviceRef="s5"/>
    <LCN channelNumber="12" serviceRef="s6"/>
    <LCN channelNumber="34" serviceRef="s7"/>
    <LCN channelNumber="324" serviceRef="s8"/>
    <LCN channelNumber="642" serviceRef="s9"/>
    <LCN channelNumber="640" serviceRef="s10"/>
    <LCN channelNumber="641" serviceRef="s11"/>
    <LCN channelNumber="643" serviceRef="s12"/>
    <LCN channelNumber="644" serviceRef="s13"/>
    <LCN channelNumber="645" serviceRef="s14"/>
    <LCN channelNumber="101" serviceRef="s15"/>
    <LCN channelNumber="102" serviceRef="s16"/>
    <LCN channelNumber="103" serviceRef="s17"/>
    <LCN channelNumber="104" serviceRef="s18"/>
    <LCN channelNumber="105" serviceRef="s19"/>
    <LCN channelNumber="106" serviceRef="s20"/>
    <LCN channelNumber="107" serviceRef="s21"/>
    <LCN channelNumber="108" serviceRef="s22"/>
    <LCN channelNumber="110" serviceRef="s23"/>
  </LCNTable>
</LCNTableList>
```

<Service list 2>

FIG. 21b

<Result>

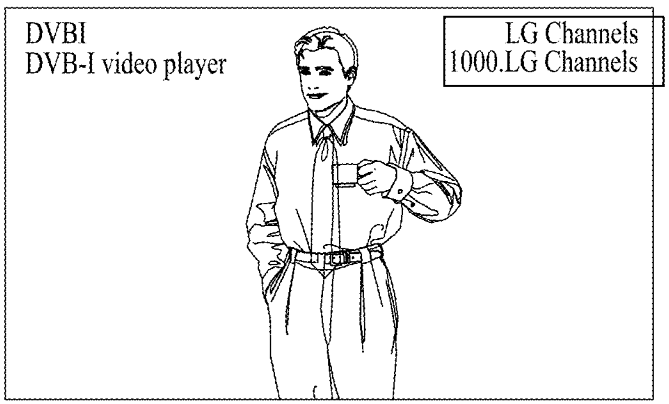

```
<LCNTableList>
  <LCNTable>
    <Secondary     elNumberRange From="1000" To="1100"/>
    <LCN chan     nber="647" serviceRef="s1"/>
    <LCN chan     nber="11" serviceRef="s2"/>
    <LCN chan     nber="4" serviceRef="s3"/>
    <LCN chan     nber="3" serviceRef="s4"/>
    <LCN chan     nber="8" serviceRef="s5"/>
    <LCN chan     nber="12" serviceRef="s6"/>
    <LCN chan     nber="34" serviceRef="s7"/>
    <LCN chan     nber="324" serviceRef="s8"/>
    <LCN chan     nber="642" serviceRef="s9"/>
    <LCN chan     nber="640" serviceRef="s10"/>
    <LCN chan     nber="641" serviceRef="s11"/>
    <LCN ch     ber="643" serviceRef="s12"/>
    <LCN chan     ber="644" serviceRef="s13"/>
    <LCN channe     umber="645" serviceRef="s14"/>
    <LCN channelNumber="1001" serviceRef="s15"/>
    <LCN channelNumber="1002" serviceRef="s16"/>
    <LCN channelNumber="1003" serviceRef="s17"/>
    <LCN channelNumber="1004" serviceRef="s18"/>
    <LCN channelNumber="1005" serviceRef="s19"/>
    <LCN channelNumber="1006" serviceRef="s20"/>
    <LCN channelNumber="1007" serviceRef="s21"/>
    <LCN channelNumber="1008" serviceRef="s22"/>
    <LCN channelNumber="1000" serviceRef="s23"/>
  </LCNTable>
</LCNTableList>
```

FIG. 23a

| Name | Semantic Definition | Constraints |
|---|---|---|
| ServiceListName | The name of the service list in a human readable form.<br>–<br>Multiple service list names can be specified as long as they have different @xml:lang values. See note 1.<br>–<br>This shall be the same as ServiceListName as in the ServiceList.Name element. | Mandatory<br>1..∞ |
| ServiceListURI | The URI where the Service List may be retrieved.<br>–<br>Multiple URIs can be specified if the same Service List can be obtained from different servers. | Mandatory<br>1..∞ |
| Delivery | Identifies the delivery methods used to deliver the services in the Service List. Indicating which of the delivery methods are required in order to offer an acceptable experience, as defined by the service list provider.<br>–<br>This enables a client to determine if all required delivery sources are available before attempting installation of the Service List. | Mandatory<br>1..∞ |
| Language | The audio language of the Service List's services.<br>–<br>Multiple Language elements can be specified in case of multilingual contents. If no language is specified, responses to service list registry queries shall include the service list offering. | Optional<br>0..∞ |
| Genre | The Genre of the contents available for the service list according to the TV-Anytime standard If no genre are specified, responses to service list registry queries shall include the service list offering.<br>– | Optional<br>0..∞ |

FIG. 23b

| | | |
|---|---|---|
| | A finer grain approach is possible by specifying the Genre at the Service level (ServiceList.Service.ServiceGenre).<br><br>Similar to ServiceGenre, possible values are taken from:<br>• ContentCS defined in ETSI TS 102 822-3-1 [7]<br>• FormatCS defined in ETSI TS 102 822-3-1 [7]<br>• ContentSubject defined in clause D.5 | |
| TargetCountry | The country code or a list of country codes indicating the countries where the service is intended to be received. If not specified, no regional constraints exist and the service can be received anywhere.<br>See note 2. | Optional<br>0..∞ |
| RelatedMaterial | Additional material related to the service. Use to signal the following:<br>Service logos, see clause 5.2.6.2 | Optional<br>0..∞ |
| @regulatorListFlag | Boolean value indicating if this is the "default list" for a country (e.g. according to the List of EU Audiovisual Regulators [i.4]).<br><br>If not specified the default value is false. Multiple values are not allowed. | Optional |
| @xml:lang | Specifies the natural language when not explicitly provided in a multilingual element. | Optional |
| NOTE 1: | Refer to clause 5.2.10 for processing of multiple language elements. | |
| NOTE 2: | Particular attention shall be paid when using @regulatorList in conjunction with multiple target countries. | |

FIG. 25

```
<ServiceListOffering regulatorListFlag="true">
    <ServiceListName>Italian Trusted Services</ServiceListName>
    <ServiceListURI contentType="application/xml">
        <dvbisd:URI>https://dvbi.italian-authority.it/trusted-services=dth.xml</dvbisd:URI>
    </ServiceListURI>
    <Delivery>
        <DASHDelivery/>
        <DVBSDelivery required="true">
            <OrbitalPosition>13.7</OrbitalPosition>
        </DVBSDelivery>
    </Delivery>
    <Language>it<Language>
    <TargetCountry>ITA</TargetCountry>
    <RelatedMaterial>
      <tva:HowRelated href="urn:dvb:metadata:cs:HowRelatedCS:2019:1001.2"/>
      <tva:MediaLocator>
        <tva:MediaUri contentType="image/png;base64">iVBORw0KGgoAAAANSUhE~</tva:MediaUri>
      </tva:MediaLocator>
    <RelatedMaterial>
</ServiceListOffering>
```

MEDIA DATA PROCESSING METHOD AND MEDIA DATA PROCESSING DEVICE

CROSS-REFERENCE TO RELATED APPLICATIONS

This application is a National Phase application under 35 U.S.C. 371 of International Application No. PCT/KR2023/007277, filed on May 26, 2023, which claims the benefit of Korean Application No. 10-2022-0064609, filed on May 26, 2022 and No. 10-2022-0068392, filed on Jun. 3, 2022, the contents of which are incorporated by reference herein in their entirety.

TECHNICAL FIELD

The present disclosure relates to a media data processing method and a media data processing device.

BACKGROUND

There is no method for implementing an IP-based TV service capable of providing the same user UX as terrestrial, satellite, or cable linear channel.

There is no method for providing a channel guide integrated with the terrestrial, satellite, or cable channel through open Internet-based native code reception rather than an app-based linear channel service.

There is no integrated broadcasting system protocol based on all of terrestrial, satellite, cable, and the Internet.

There is no method for acquiring Internet broadcasting service signaling by a receiver without a terrestrial, satellite, or cable tuner.

There is no service discovery system for acquiring a broadcast service based on Internet transmission.

There is no Internet-based broadcast service signaling mechanism.

There is no method for maintaining the updated state of a content guide corresponding to the DVB-I service.

SUMMARY

An object of the embodiments is to provide a media data processing device for implementing an IP-based TV service capable of providing the same user UX as the terrestrial, satellite, or cable linear channel.

An object of the embodiments is to provide a media data processing device for providing a channel guide integrated with the terrestrial, satellite, or cable channel through open Internet-based native code reception rather than an application-based linear channel service.

An object of the embodiments is to provide a media data processing device for seamlessly providing a real-time/non-real-time media streaming service rather than directly receiving terrestrial (fixed) waves, in consideration of a situation where broadcast services are consumed through media such as OTT, PC, IPTV, and the like of IP-based devices, as well as high traffic of unicast.

A media data processing method according to embodiments may include generating media data; generating a service list related to the media data; and transmitting the media data and the service list based on a network. A media data processing method according to embodiments may include receiving media data and a service list related to the media data based on a network; and processing the media data based on the service list.

A receiver not equipped with a conventional tuner may efficiently discover and acquire an Internet-based broadcast service over a broadband network.

In receiving an aggregated service list according to embodiments, the versioning/expiration management method for each service and the selective parsing and storage of each service may eliminate the need to receive the entire service list.

Content or user experience that may provide services suitable for capability may be efficiently provided.

BRIEF DESCRIPTION OF THE DRAWINGS

The accompanying drawings, which are included to provide a further understanding of the disclosure and are incorporated in and constitute a part of this application, illustrate embodiment(s) of the disclosure and The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 4A and 4B show a DVB-I service list type according to embodiments;

FIGS. 5A and 5B show a DVB-I service type according to embodiments;

FIGS. 6A, 6B, and 6C show a service instance type according to embodiments;

FIG. 7 shows DASH delivery parameters for simulcast according to embodiments;

FIG. 8 shows a scheme for selecting a service instance based on DASHDeliveryParametersType according to embodiments;

FIG. 9 shows an example of a DVB-I service instance according to embodiments;

FIG. 13 shows DVB-I service discovery information according to embodiments;

FIG. 14 shows the syntax of a service list registry entity according to embodiments;

FIGS. 15A and 15B show semantics of a service list registry entity according to embodiments;

FIG. 17 illustrates a method for coping with channel conflict in receiving multiple service lists according to embodiments;

FIGS. 19A and 19B show LCN table entry syntax according to embodiments;

FIG. 20 shows an example of resolving service channel conflicts according to embodiments;

FIGS. 21A and 21B illustrate an example of resolving a channel duplication issue according to embodiments;

FIGS. 23A and 23B show service list offering fields according to embodiments;

FIG. 25 illustrates a service list registry request from a client and a UI/UX configuration for service list search and selection in response to the request according to embodiments;

DETAILED DESCRIPTION

Figure 1:
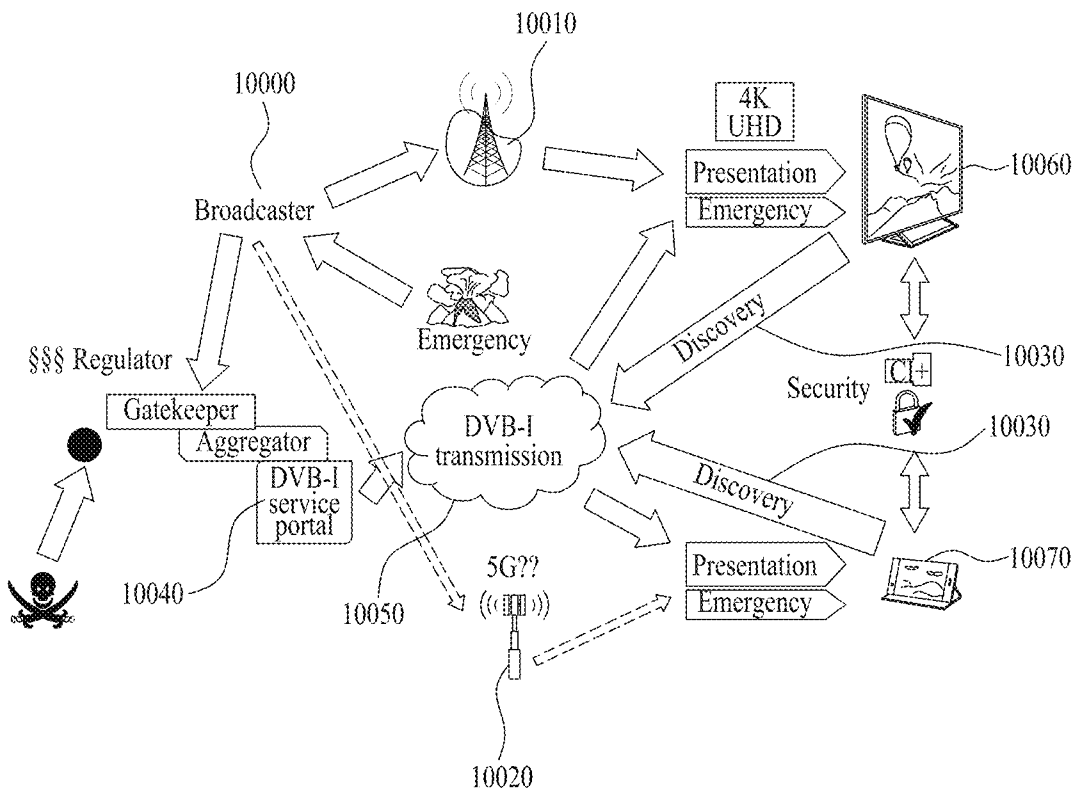
FIG. 1 shows a service scenario according to embodiments.

Hereinafter, embodiments of the present disclosure will be described in detail with reference to the accompanying drawings. The same or similar components are given the same reference numbers and redundant description thereof is omitted. The suffixes "module" and "unit" of elements herein are used for convenience of description and thus are used interchangeably and do not have any distinguishable meanings or functions. Further, in describing the embodiments disclosed in this specification, if a detailed description of related known techniques would unnecessarily obscure the gist of the embodiments disclosed in this specification, detailed description thereof will be omitted. In addition, the attached drawings are provided for easy understanding of the embodiments disclosed in this specification and do not limit technical idea disclosed in this specification, and the embodiments should be construed as including all modifications, equivalents, and alternatives falling within the spirit and scope of the present disclosure.

It is apparent that the following embodiments are intended to embody the present disclosure and are not intended to limit or restrict the scope of the present disclosure. All techniques easily conceivable by those skilled in the art from the detailed description and embodiments of the present disclosure are interpreted as belonging to the scope of the present disclosure.

The following detailed description is to be construed in all aspects as illustrative and not restrictive. The scope of the present disclosure should be determined by reasonable interpretation of the appended claims and all changes which come within the equivalent scope of the present disclosure are within the scope of the present disclosure.

Reference will now be made in detail to the exemplary embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details. Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings. In addition, the accompanying drawings and the detailed description should not be construed as limiting the embodiments set forth herein and should be interpreted as covering all equivalents to the embodiments disclosed in the accompanying drawings and the detailed description or other substitutions.

A media data processing method/device according to embodiments may refer to a media data transmission/reception method/device. The media data processing method/device according to the embodiments may be simply referred to as a method/device according to the embodiments.

The method/device according to embodiments relates to a method for discovering and acquiring Internet-based broadcasting-related media data (which may be referred to as a service).

FIG. 1 shows a service scenario according to embodiments.

The method/device according to the embodiments may provide a method for supporting DVB-I standard based multi-viewport user personalization.

The method/device according to the embodiments may provide a communication network extension method such as DVB-I over 5G extension and 6G extension.

The method/device according to the embodiments may provide an additional web image extension considering DVB-I backward compatibility.

Embodiments provide a service discovery scheme to provide an Internet-based broadcast service.

Embodiments propose additional information that should be defined for Internet-based broadcast service identification.

Embodiments provide a system mechanism for acquiring Internet-based broadcast service signaling.

Embodiments propose a versioning/expiration management method for each service and a selective parsing and storage method for each service in receiving an aggregated service list.

Embodiments propose a channel management method carried out when an Internet linear channel is hidden/selectable/inactive.

Embodiments propose a service discovery signaling scheme to provide an Internet-based broadcast service.

Embodiments provide a service list metadata envelope structure used in transmitting a fragmented service list for each unique service in a multipart/related container.

Embodiments provide a method for indicating a current channel state to the user or providing an alternative channel when the user directly accesses the current channel in the hidden/selectable/inactive case of an Internet linear logical channel.

According to embodiments, a receiver not equipped with a traditional tuner may be allowed to perform Internet-based broadcast service discovery and acquirement over a broadband network.

According to embodiments, in receiving an aggregated service list, a versioning/expiration management method for each service and selective parsing and storage of each service may be performed, thereby eliminating the need to receive the entire aggregated service list.

According to embodiments, a better media service may be provided by blocking a logical channel service that fails to provide broadcasting and causes inconvenience to users and providing an Internet return channel alternative service when the Internet linear channel is hidden/selectable/inactive.

The traditional IP-based linear channel service is operated in a manner that authentication is granted through the subscription of a specific provider (e.g., an ISP, a network operator) and an IP linear service is received through the set-top box (STB) provided by the provider. In addition, recently, connectivity TVs have been introduced, thereby making a set-top boxless (STB-less) IP linear service available. Representative standard technologies are ATSC 3.0, IBB, and HbbTV. Clients may be provided with various linear rich-media services by operating an application on the OS platform inside the TV. Various operators provide their own developed service application to be installed on the TV platform, and the application defines a server that may receive data for the service and APIs that enable request/reception. On the basis of the life cycle, the client may access the app through the TV UI and receive various services through the app.

In North America and Europe, the popularity of OTT channels is as high as watching linear TV worldwide, and the OTT has become an essential media application for IP-based devices with the expansion of the OTT market. However, the influential form of OTT has become an exclusive service through its own platform and a service eco-system dedicated to the OTT. In other words, the OTT forms its own app-ecosystem consumption pattern in terms of codec, protocol stack, application, browser, and the like that only each OTT provides.

In this regard, embodiments propose a method and an device that may address issues such as the exclusive platform of OTTs and dependency on the operation of applications.

Embodiments propose a service that discovers a service by which a service is discovered at a receiver native level and a client accesses an accessible service server and receives a linear service, in contrast with conventional technology that requires an App to be executed to provide a channel UX similar to the terrestrial (T), satellite (S), or cable (C) linear channel service.

In addition, embodiments propose a service scenario in which the OTT's own platform is integrated into a single unified TV native platform to allow users to receive and view OTT content on a channel without executing an OTT app.

Referring to FIG. 1, a broadcaster 10000 may transmit a service on a terrestrial (T), satellite (S), or cable (C) channel 10010 and an Internet channel 10020 simultaneously. Service providers and manufacturers of devices capable of receiving a DVB-I service 10050 may obtain authentication of a service channel through regulation and provide Internet channels through existing linear services and channel aggregators.

In order to present a list of existing linear broadcasting channels (for example, terrestrial, satellite, and cable channels) and an Internet channel list in an aggregated form, bootstrap 10030 may be operated based on service discovery information provided over the existing linear network.

On the broadcaster side, the existing traditional service provision type may be extended, and additional services may be provided in the form of an on-demand/multicast service along with the existing linear channel network. In addition, a personalization service may be provided through a connection-based usage report of an Internet channel.

From the perspective of TV/STB manufacturers, by providing a channel list 10040 aggregating OTT services with traditional T/S/C channels, opportunities to provide various services and expand the functions of the terminal may be obtained.

In the case of the network/ISP, OTT contents may be aggregated through their network infrastructure to expand service provision. In addition, through dynamic allocation of unicast/multicast, delivery performance enhanced compared to that of a terminal providing a non-management network-based service may be provided.

In other words, the broadcaster 10000 may transmit broadcast data over the traditional broadcast network 10010 and the Internet network 10020. A reception device according to embodiments, for example, a TV 10060 or a second device 10070 may make a request for the service discovery 10030 of the broadcast data to the DVB-I provider or server 10050, and receive the aggregated DVB-I service list 10040. Thus, service signaling may be performed on both the traditional linear channel and the Internet channel without the process of installing and executing a separate app at the native level.

The method/device according to the embodiments may address issues disclosed below, based on the structure shown in FIG. 1.

When the next/now guide information is provided through a metadata update period, the end point of the request for the entire service list or an individual service may be the same. The limitation that an individual period cannot be configured for each service and that protocol communication must be performed with the same endpoint may be resolved through @minimumMetadataUpdatePeriod in the DVB-I service hierarchy (see FIG. 15, etc.) according to embodiments.

When the manufacturer service repository is added to one of the DVB-I service discovery entities in the central service repository or the private repository, information for handling supportable device capabilities may be provided.

That is, information for determining whether the service list required by a client is supportable within the device may be provided.

In the DVB-I according to the embodiments, a service may be mainly received based on a service list. Each service list may be operated and managed by a specific repository. A repository providing the existing DVB broadcasting list may define a DVB-I service list in a manner of allocating an LCN based on the country or specific region due to the characteristics of the current European broadcasting service. On the other hand, specific DVB-I service list providers collect independent services regardless of regions and define an LCN list, and accordingly LCN allocation may be configured as desired by the service list providers. Therefore, in this background, there is a potential issue of channel collision when the DVB-I client receives and merges multiple service lists.

In DVB-I over 5G, the service should be smooth and continuous between delivery routes supported by multiple distributions, and should be provided through efficient and flexible connection according to the optimal network environment.

There is no issue in service continuity and synchronization because media data is received only through the restful API at a location specified in the service app regardless of the existing network connection type. On the other hand, in the case of DVB-I for 5G, the bootstrapping process may differ among the types of networks, and the bootstrapping method and location may depend on the infrastructure of the operators.

The propagation delay delivered varies according to the network characteristics. Thus, in the case of a linear service, each network may provide a different environment for the reference time and media characteristics.

Discovery URL and media location URL differ among operators, and it is difficult to perform complete switching in the middle of the media.

There are no clear reference for determining the need for switching within the network and the degradation of signal quality.

In configuring a user interface (UI) through a service list and presenting the service list to users, it is not clear how specific information such as audio, video, and subtitle information should be. Further, in contrast with conventional broadcast transmission, an acquisition path of audio, video, and subtitles constituting content such as HDR/HFR is present at the MPD level, and thus information may not be known at the stage of service UI configuration.

A predefined TVA attribute contains only basic information (frame rate/resolution) related to audio, video, and subtitles and is thus insufficient for user access/download.

There is a need for additional requirements for a user personalization service in a DVB-I service, and embodiments provide a solution to overcome limitations related to technical configurations that are difficult to support by the current DVB-I standard.

Embodiments provide a service discovery scheme to provide an Internet-based broadcast service.

Embodiments propose additional information that should be defined for Internet-based broadcast service identification.

Embodiments provide a system mechanism for acquiring Internet-based broadcast service signaling.

Embodiments propose a versioning/expiration management method for each service and a selective parsing and storage method for each service in receiving an aggregated service list.

Embodiments propose a channel management method carried out when an Internet linear channel is hidden/selectable/inactive.

Embodiments may provide a method of addressing an issue of presenting the information of the existing program guide rather than the up-to-date information about the content currently being consumed when a live program of the DVB-I service is over-running.

A new element and end point extension to which an individual period is applicable for each service may be implemented.

When the DVB-I client receives and aggregates multiple service lists, the issue of channel collision may be addressed.

Proper alignment may be provided between service instances such that switching between service instances delivered over different networks may be recognized to be reasonably smooth.

Switching between DVB-I service instances including 5GBC, 5GMS, and OTT (non-5G networks such as LTE and Wi-Fi) may be performed.

Embodiments extend service instances such that essential information for content selection may be displayed on a service/content guide UI based on information provided by a service discovery server or a service list server.

Embodiments extend, through TVA attribute extension, information that is provided by the existing scheme and extend ClassificationSchemeType for defining specific video information.

Subpicture information in the MPEG versatile video coding (VVC) codec is merely coordinates/size indicating a position, additional information for control at a CTU level required in a video encoding process, or position information from the codec perspective, and does not mean specific coordinates or pixel positions for rendering. In other words, information about a rendering position is not defined, and thus additional related extension is required Embodiments propose a service discovery signaling scheme to provide an Internet-based broadcast service.

Embodiments provide a service list metadata envelope structure used in transmitting a fragmented service list for each unique service in a multipart/related container.

Embodiments provide a method for indicating a current channel state to the user or providing an alternative channel when the user directly accesses the current channel in the hidden/selectable/inactive case of an Internet linear logical channel.

To address issues such as over-running of a live program of the DVB-I service and provision of information of the existing program guide in place of the up-to-date information about the content currently being consumed, the following information may be used according to embodiments: (1) reference time information for applying a dynamic polling interval; (2) an offset of x sec from the reference time information (e.g., DVB-I service availability end time); (3) a polling interval to be newly applied; and (4) version information for comparison with the existing information.

The method/device according to the embodiments may perform dynamic polling based on the above information and @MinimumMetadataUpdatePeriod.

In allocating a logical channel number corresponding to a single service, an indication that the corresponding channel is a channel to which dynamic polling is applied instead of a static pull method may be provided.

When the now/next content guide source currently consumed is acquired in the DVB-I hierarchy, the information of @ScheduleEndPoint in ContentSourceType may be defined as the same end point in the service list type and the service list, and related information may be requested and received. Information about individual intervals may be acquired for each service. scheduleInfoEndPoint may be generated to request and receive event information in a specific interval.

scheduleInfoEndPoint may be generated to request and receive event information in a specific interval.

The DVB-I client may receive service discovery entities in the bootstrapping process, and display list entries filtered according to language, country, region, and postcode. Service entities and their service entity repositories adapted to the user selection or environment may be searched. In this case, the service list repository operated by a manufacturer may be searched and device capability information for checking whether the service list is supported may be defined.

When the DVB-I client receives and aggregates multiple service lists, a specific condition may be assigned to the channel allocated to each service such that channel management may be performed within the DVB-I client. To this end, <LCNTableEntryType> may be extended in the current DVB-I service list scheme.

The service list scheme may be extended to support time alignment between service instances delivered over different networks.

To support service instance switching, the DASH delivery parameter may be extended in the following DVB-I service list scheme.

According to embodiments, by extending related information, criteria for service selection may be clarified for the user. In addition, from the receiver perspective, clear information may be presented on a UI/UX by performing service filtering.

Embodiments may propose a solution for scene description and rendering information for displaying VVC encoding-based subpictures.

In embodiments, scene description information may be extended at a position at which video characteristics are defined in DVB-I and DASH layers, which are system layers, and information about the hierarchy actually encapsulating a subpicture may be referenced.

In embodiments, receiver operation and receiver backward compatibility for supporting a related use case may be considered.

A receiver not equipped with a conventional tuner may perform Internet-based broadcast service discovery and acquirement over a broadband network.

In receiving an aggregated service list, a versioning/expiration management method for each service and selective parsing and storage of each service may be performed, thereby eliminating the need to receive the entire aggregated service list.

A better media service may be provided by blocking a logical channel service that does not provide broadcasting and causes inconvenience to users and providing an Internet return channel alternative service when the Internet linear channel is hidden/selectable/inactive.

When tune-in or channel change is performed, the device according to the embodiments may display up-to-date information about a corresponding channel rather than showing the guide of an over-running program.

A client-side algorithm for DVB-I dynamic polling may be defined in the entire attributes of the content guide at the service list level to control the polling operation of the entire content guide, or may be defined at the service level to apply the dynamic polling algorithm to individual services.

A separate caching module configured to manage a logical channel database corresponding to the service in the DVB-I client may dynamically process the attribute of the channel to pre-indicate that the dynamic polling algorithm is applied to the channel in updating services at once or individually.

In updating the DVB-I service event or content guide information, the up-to-date information in the client may be updated by adding an end point for updating individual intervals for each service.

Depending on the device, service entities and service entity repositories thereof adapted to the user selection or environment may be searched, and a service list supported by a specific manufacturer may be retrieved to provide an opportunity to consume the services.

When the DVB-I client receives and merges multiple service lists or receives an additional service list on the default legacy channel, a channel ordering method that may reflect the intention of the service provider and be handled by the DVB-I client without any issue may be provided.

A service should be smooth and continuous between delivery routes supported by multiple distributions including 5GBC, 5GMS, and OTT in DVB-I, and may be provided to users through efficient and flexible connection according to the optimal network environment.

Embodiments may clearly present a service that may be currently provided to the user, through extended information, induce rational selection, and clarify criteria for service selection.

Embodiments may provide a personalized service by transmitting several subpictures in a DVB-I based service and providing different viewports according to modes.

For the method/device according to the embodiments, reference may be made to document DVB-I A177.

In the conventional IP-based linear channel service, authentication is granted through the subscription of a specific provider (e.g., an ISP, a network operator) and an IP linear service is received through the set-top box (STB) provided by the provider. In addition, recently, connectivity TVs have been introduced, thereby making a set-top boxless (STB-less) IP linear service available. Representative standard technologies are ATSC 3.0, IBB, and HbbTV. Clients may be provided with various linear rich-media services by operating an application on the OS platform inside the TV. Various operators provide their own developed service application to be installed on the TV platform, and the application defines a server that may receive data for the service and APIs that enable request/reception. On the basis of the life cycle, the client may access the app through the TV UI and receive various services through the app.

In North America and Europe, the popularity of OTT channels is as high as watching linear TV worldwide, and the OTT has become an essential media application for IP-based devices with the expansion of the OTT market. However, the influential form of OTT has become an exclusive service through its own platform and a service eco-system dedicated to the OTT. In other words, the OTT forms its own app-ecosystem consumption pattern in terms of codec, protocol stack, application, browser, and the like that only each OTT provides.

Currently, for DVB-I, a reference client application is being developed in the industry based on the A177 document. The DVB-I standardization group is identifying development related issues and problems of the current standard and proceeding with clarification for appropriate extension and smooth development.

A method to solve an over-running issue while maintaining backward compatibility of DVB-I phase 1 has been devised.

When a client-side algorithm for DVB-I dynamic polling is applied, a different role and receiver operation are performed according to DVB-I service hierarchy, and thus the receiver operation according to the position of @MinimumMetadataUpdatePeriod has been described above.

Since a content guide manager and a service list manager perform separate parsing and caching processes and need to indicate a channel that may be dynamically changed in the process of managing acquired LCN DB information, the information is extended.

In allocating a logical channel number corresponding to a single service, indication information indicating that the corresponding channel is a channel to which dynamic polling, rather than a static pull scheme, is applied may be added.

In the DVB-I phase 1 scheme, data is received according to the pull-only method, and accordingly it may not be checked whether the up-to-date information of the code level is acquired. In this technical background, in order to update the up-to-date information, the DVB-I client of the device according to the embodiments may address the issue through a specific polling interval.

In the current service hierarchy, event information may be acquired at once from a service list or service level. However, the method is the same at both levels, and thus updating a specific interval for each individual service may be impossible. Thus, the solution is proposed.

In this regard, the disclosure proposes a method and a device that may address issues such as the exclusive platform of OTTs and dependency on the operation of applications.

Embodiments propose a service in which the receiver discovers a service at the native level and the client accesses an accessible service server to receive a linear service, in contrast with conventional technology that requires an App to be executed to provide a channel UX similar to the T, S, or C linear channel service.

In addition, embodiments propose a service scenario in which the OTT's own platform is integrated into one unified TV native platform to allow users to receive and view OTT content on a channel without executing an OTT app.

Figure 2:
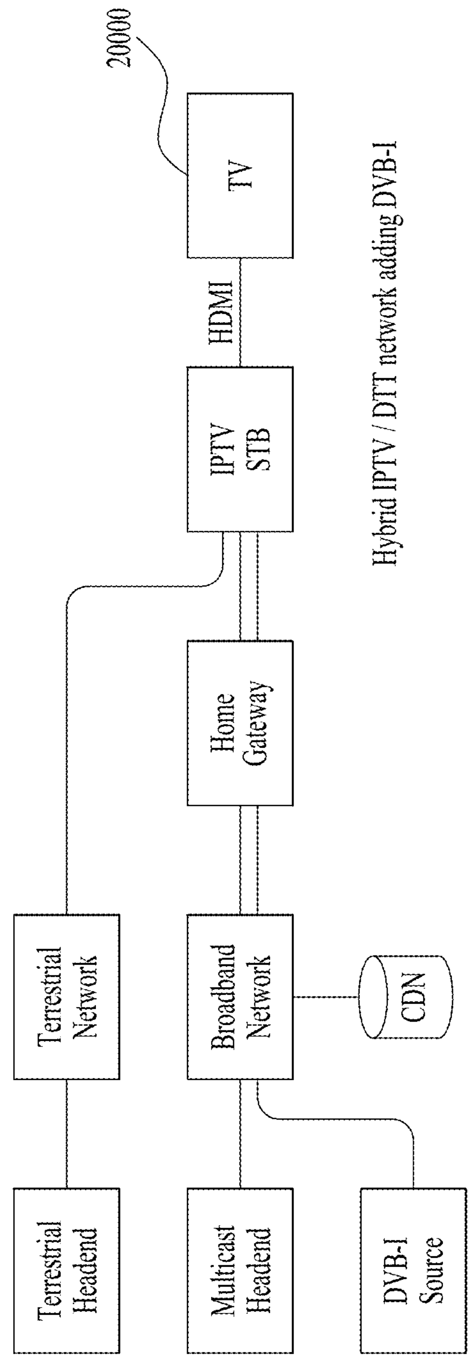
FIG. 2 is a flowchart of an operation according to embodiments from the perspective of a network operator/ISP according to embodiments.

FIG. 2 is a flowchart of an operation according to embodiments from the perspective of a network operator/ISP according to embodiments.

The device 20000 according to the embodiments may be a TV receiver. That is, it may be a device according to a hybrid IPTV/DTT network that supports DVB-I service. The reception device 20000 may be connected to an STB. The connection may be established by, for example, HDMI. The IPTV STB may receive a terrestrial broadcast signal from a terrestrial headend over a terrestrial network, and may receive various services and/or data from a multicast headend, which provides multicast services, a DVB-I source, which provides DVB-I services, and/or a content delivery network (CDN), which provides Internet content or the like, through a home gateway and a broadband network.

In particular, in the case of OTT, an OTT application suitable for a different OS environment is separately provided for each existing terminal. However, the method/device according to the embodiments may use a service through an industry standard based ecosystem without such a separate application. This provides a common service interface, thereby providing a convenient and efficient service access.

Figure 3A:
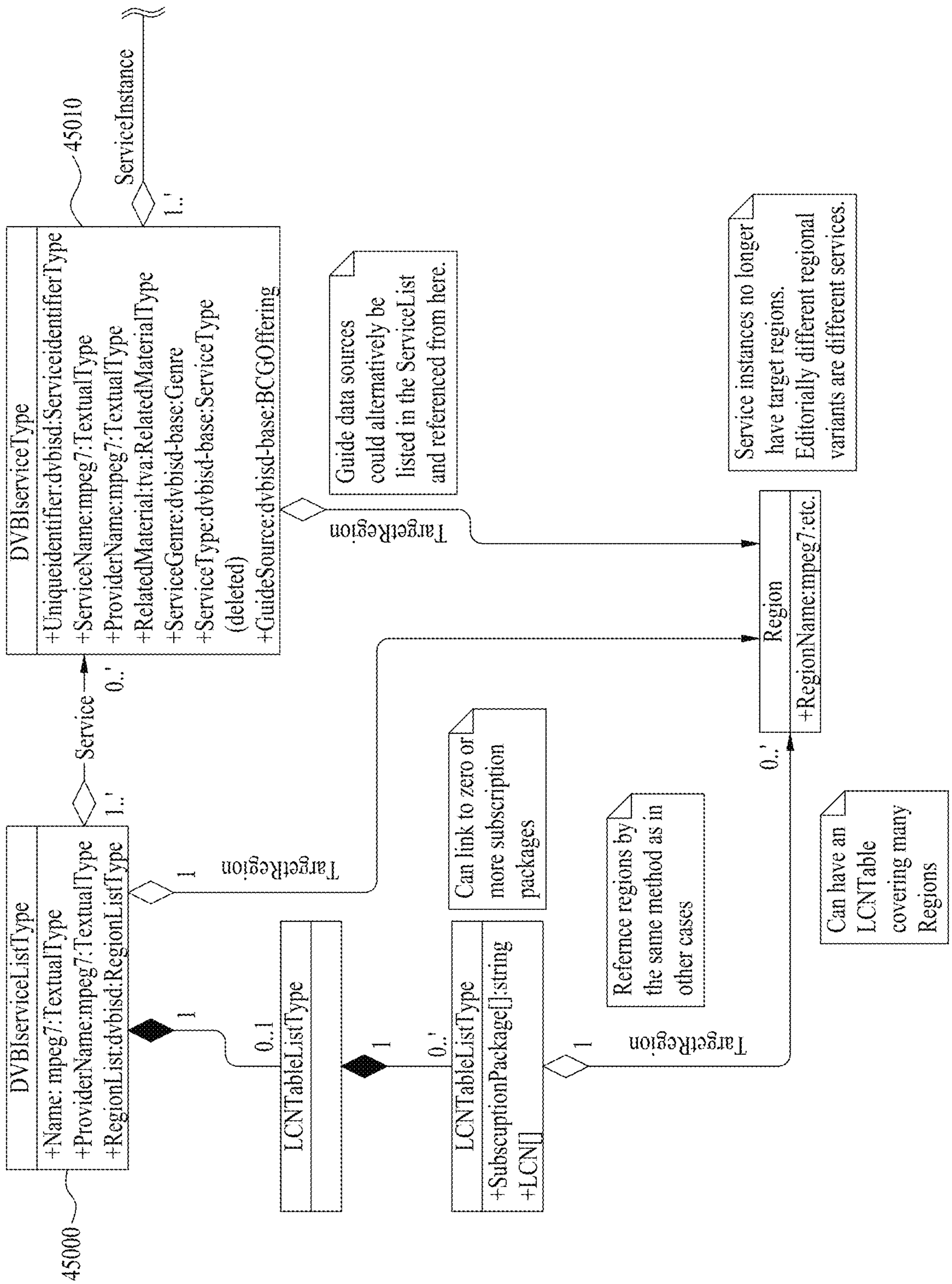
FIGS. 3A and 3B show a service list hierarchy according to embodiments.
Figure 3B:
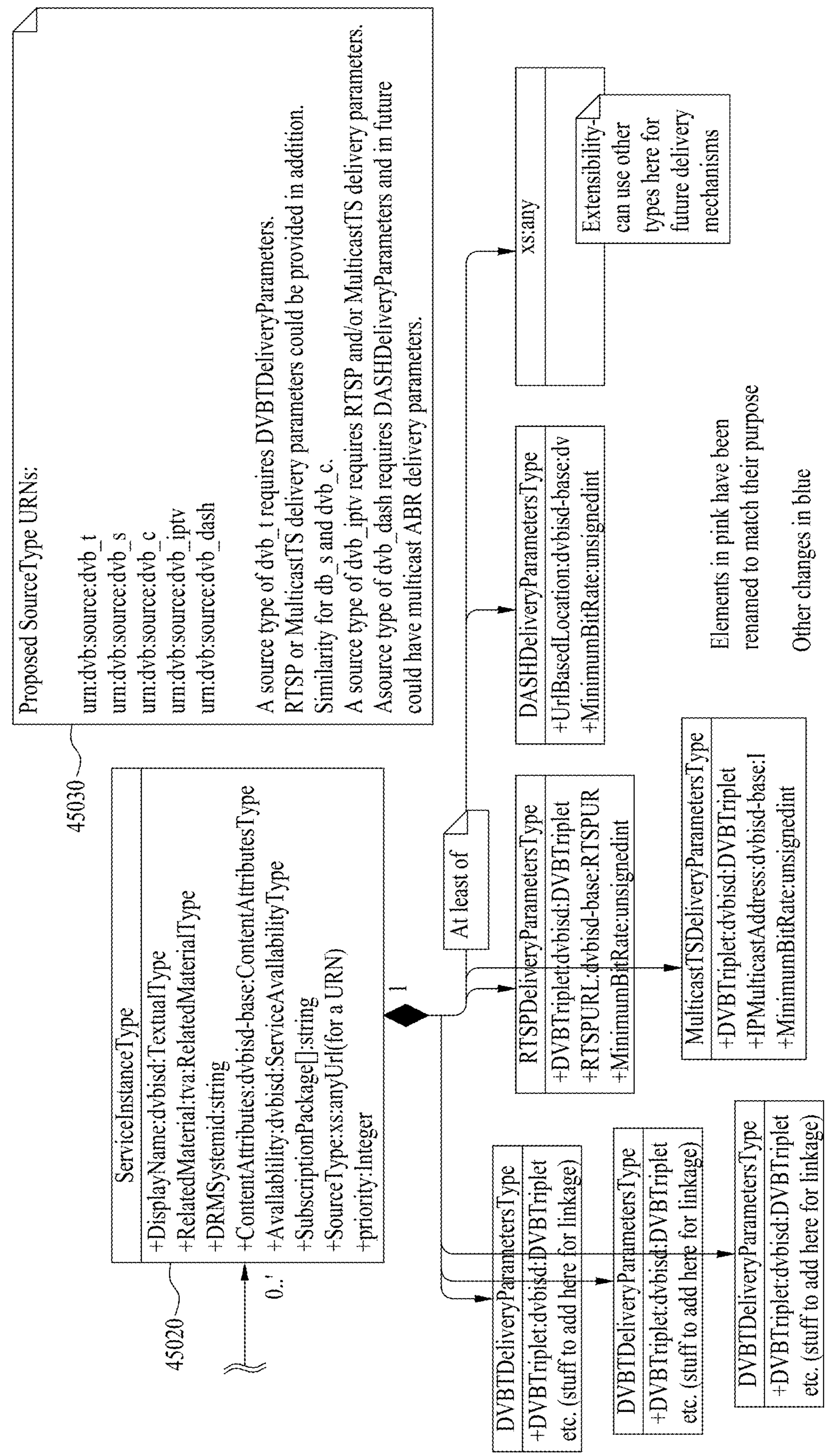

FIGS. 3A and 3B show a service list hierarchy according to embodiments.

FIG. 3 shows a service list hierarchy for the service scenario of FIG. 1.

The DVB-I service list may contain respective services, and each service may contain service instances. Multiple service instances may be defined according to each delivery network, and uniqueness may be distinguished according to the URN of source_type.

The DVB service list type 45000 may reference the DVB-I service type 45010 for each service. The DVB-I service type 45010 signals a related material and a guide source. The DVB-I service type 45010 may reference the service instance type 45020 for each service instance. The service instance type 45020 signals a subscription package for the related material and a source type for URN. The service instance type may reference at least one of a delivery parameter type for DVB T/S/C, an RTSP delivery parameter type, a multicast delivery parameter type, or a DASH delivery parameter type.

The proposed source type URNs 45030 provide URNs for DVB T/S/C/IPTV/DASH, etc.

The DVB service list type 45000 references the LCN table list type, and the LCN table list type references the LCN table type. The LCN table type, the DVB service list type 46000, and the DVB-I service type 45010 may reference REGION. Related region information may vary among services.

The elements in FIG. 3 will be described in detail with reference to the figures described below.

FIGS. 4A and 4B show a DVB-I service list type according to embodiments.

FIG. 4 shows service list information included in FIG. 3.

ServiceList is a list of details and locations of IP services provided by a service provider. Service providers may divide their services into multiple service lists. Thus, this attribute is essential.

Name is the name of a service list in a readable form. Multiple service list names may be expressed in different languages. This attribute is mandatory.

ProviderName is the name of the provider of the readable service list. Multiple values for the provider name may be described in different languages. This attribute is mandatory.

RelatedMaterial indicates an additional material related to the service. This attribute is optional.

RegionList is a list of geographic regions with logical identifiers that are used to provide regional information of services in the service list or the service list. This attribute is optional.

TargetRegion represents the identifiers of the regions specified in the RegionList for which this service list is targeted. This attribute is optional.

LCNTableList is a list of tables that define regionalized and packaged logical channel numbers for the respective services. This attribute is optional.

Service represents services that are part of the service list. This attribute is optional.

@version is the version number of the service list. The value is incremented for every published change. This attribute is mandatory.

FIGS. 5A and 5B show a DVB-I service type according to embodiments.

The DVB-I service types in FIG. 5 describe the above-described service types in the form of a table.

UniqueIdentifier is the unique ID of the service. This ID may never be changed for a service. Other parameters of this service may be changed. This attribute is mandatory.

Service Instance is an instance having A/V content for this service. When multiple elements of the type of this attribute are present and available, the one with a lower value of the @priority attribute may have a higher priority (or vice versa). All service instances for a given service may have the same content. This attribute is optional.

TargetRegion is the regions where the service is received. When not specified, no region constraints exist. This attribute is optional.

ServiceName is the name of the service. Service names may be specified in various languages. This attribute is mandatory.

ProviderName is the readable provider name of this service. This element may be specified in various languages and is mandatory.

RelatedMaterial is an additional material related to the service. The material may include, for example, out of service banners, service related applications, and service logos. This attribute is optional.

ServiceGenre is the genre of the service. ServiceGenre is optional.

ServiceType is the type of service (refer to the description in ETSI EN 300 468). ServiceType is optional.

RecordingInfo is information allow a DVB-I client to determine whether or not the content from this service is recorded, time-shifted, or redistributed. RecordingInfo is optional.

GuideSource is the details of a broadband content guide carrying metadata for this service. GuideSource is optional.

@version is the version number of this service. It is incremented for every published change. @version is mandatory.

FIGS. 6A, 6B, and 6C show a service instance type according to embodiments.

Elements of a service instance type will be described with reference to FIG. 6.

DisplayName is a readable name of the service associated with a specific service location. Multiple service names may be specified in various languages. When not present, the ServiceName field may be used. This attribute is optional. In the present disclosure, an attribute may correspond to an element, a field, information, or a value according to a level, and may be referred to by various terms.

RelatedMaterial is an additional material related to the service. Specifically, it may include a no-service banner, service related applications, service logos, and the like. A related material with a specific value of the attribute HowRelated, which is provided within a ServiceInstance element, supercedes any corresponding related material with the value of HowRelated provided within a Service element. This element is optional.

DRMSystemId indicates any content projection schemes used for the service. The value may be the same as the @schemeldURI defined in document DVB A168. This value is optional.

Refer to Annex D.1.3.2 of ETSI TS 103 205 for ContentAttributes, whose value is optional.

Availability indicates the period in time when this service location is expected to be active. This value is optional.

SubscriptionPackage specifies a subscription package in which this service is included. This value is optional.

FTAContentManagement: DVB-I service instances that do not use DRM may carry an FTAContentManagement element to define the content management policy for the ServiceInstance. The semantics of each attribute may be specified in the corresponding fields of FTA_content_management_descriptor, which is a descriptor in document ETSI EN 300 468. This value is optional.

SourceType identifies the primary delivery source for this service instance. SourceType determines the required delivery parameters. This value is optional.

DVBTDeliveryParameters provides delivery parameters for DVB-T serviceS.

DVBSDeliveryParameters provides delivery parameters for DVB-S services.

DVBCDeliveryParameters provides delivery parameters for DVB-C services.

RTSPDeliveryParameters provides delivery parameters for RTSP-based services.

MulticastTSDeliveryParameters provides delivery parameters for services delivered using multicast UDP.

DASHDeliveryParameterso provides delivery parameters for services using DVB DASH delivery.

SATIPDeliveryParameters provides parameters that a DVB-I client supporting SATIP may use to receive a service instance from an SATIP server.

The above-mentioned parameters may be described according to the SourceType.

@priority indicates the priority of this service instance relative to the other service instances of the service. This value is optional.

FIG. 7 shows DASH delivery parameters for simulcast according to embodiments.

UriBasedLocation: Refer to Annex D.1.3.2 of ETSI TS 103 205 [2] for semantic definition.

MinimumBitRate: Threshold bit-rate under which an alternative source for the same service should be preferred, if available.

This figure shows DASH delivery parameters for simulcast according to embodiments in a table.

The figure shows the detailed syntax of the above-described DASH delivery parameters.

DASHDeliveryParameters according to the embodiments may be additionally extended for simulcast.

Refer to Annex D.1.3.2 of document ETSI TS 103 205 for UriBasedLocation, which is mandatory. When the DASH service is simulcast, this value may provide location information based on the URI.

MinimumBitRate indicates a threshold bit-rate under which an alternative service for the same service should be preferred. This value is optional.

As a child element of the DVB-I service type, a service interface may be provided according to the delivery network. A client may consider each @priority and device capability and the reception device may determine a service instance.

Here, @minimumBitrate indicates throughput in terms of a network stack for receiving a stream within a service instance.

For example, @minimumBitrate according to the embodiments may indicate throughput in terms of a network stack for receiving a stream within a service instance. That is, the device according to the embodiments may check the minimum bit rate information for the minimum bit-rate at which the network may currently receive the DASH service.

Based on the information, it may be determined whether the service instance is playable. However, in the case of the currently defined information, when multiple service instances are contained in DVBiservicetype, it is difficult for the client to select a service instance based only on the information of @minimumBitrate.

For example, since the minimumbitrate for determining playability is a minimum condition, the fallback condition between bitstreams may not be satisfied by satisfying the minimum condition alone.

For example, it is assumed that there are two service instances as follows.

(Service instance 1) DVB-T delivery method, HD, H.264/AVC (Service instance 2) DVB-I DASH delivery method, MinimumBitRate 1.5 Mbps For example, in the case where there are two service instances (e.g., service instance 1 and service instance 2), a client related to the transmission/reception device according to the embodiments is an HEVC UHD capable terminal, and the network situation above the bit rate of the other comparison target may be ensured, the receiver (terminal) should request service instance 2 (e.g., HEVC UHD). However, unless the MPD is received through a request, the receiver cannot know, from the current information, an attribute indicating that a stream of better quality than instance 1 is included. Receiving and comparing all MPDs of all service instances may not only be a burden from the perspective of the receiver, but also may be an issue in rational network selection. A scheme for providing a better service between instances within DVB service scheme information is proposed below. That is, embodiments may be implemented in which the burden of the receiver parsing/analyzing all MPDs or similar signaling information is eliminated and the receiver is allowed to quickly identify and request a better service instance in response to a network situation of a specific bit rate or higher.

FIG. 8 shows a scheme for selecting a service instance based on DASHDeliveryParametersType according to embodiments.

The DASH DeliveryParametersType may include ComparisonBitRate and ComparisonContentAttributeType. The ComparisonContentAttributeType may include an AudioAttributes element, a VideoAttributes element, a CaptionLanguage element, and a SignLanguage element.

The ComparisonContentAttributeType may correspond to the ContentAttributes element included in the ServiceInstanceType 45020.

The DASHDeliveryParametersType may include ComparisonContentAttributeType. In addition, the ComparisonContentAttributeType may include AudioAttribute, VideoAttributes, CaptionLanguage, SignLanguage, and ComparisonBitRate as elements.

ComparisonBitRate and ComparisonContentAttributeType, which are common elements in options 1 and 2, may be defined as follows.

@ComparisonBitrate indicates a bitrate for handling a specific IP delivery service instance that provides a better user experience than a non-IP delivery service instance available for this service.

@ComparisonContentAttributeType indicates which video characteristic is available for the DVB-I client to provide a better user experience than the non-IP delivery service instances available for this service.

FIG. 9 shows an example of a DVB-I service instance according to embodiments.

The figure shows two service instances: the first one is DVB-S ServiceInstance and the second one is DVB-I ServiceInstance.

The first service instance has priority 0, and the display name is ABC drama. As shown in FIG. 56, AudioAttributes, VideoAttributes, and the like are signaled as attributes, and the ServiceInstance includes DVBSDeliveryParameters. Here, the priority '0' may be an example value. In addition, the reception device according to the embodiments may check an additional service instance in addition to the service instance to provide, through signaling information according to embodiments, a service instance capable of providing a better service to the user in consideration of not only the priority value, but also the network status or available bandwidth and capabilities of the client.

The second service instance has priority 1, and the display name is ABC drama. DASHDeliveryParameters may signal the address of https://live.daserste.de/0001 Das %20Erste.mpd</dvbisd-base:URI for content of the application/dash+xml type through a URI-based location. The MinimumBitRate is 1M, and the ComparisonBitRate is 7M. The ComparisonContentAttribute signals VideoAttributes through "urn:mpeg:mpeg7:cs:VideoCodingFormatCS:2001:2.2.2" and HEVC Video Main10 Profile @Main Level</tva:Name>(UHD enable). Specifically, the value of the ComparisonBitRate may be an example value. The reception device (terminal, client, etc.) according to the embodiments checks the value of ComparisonBitRate, and recognize, from the value, that a better service is provided. For example, when a better service corresponding to the value of 7M is provided, the method/device according to the embodiments may additionally define corresponding video attribute information like the ComparisonContentAttribute of FIG. 55. Accordingly, the reception device according to the embodiments may check the presence of the UHD stream and switch the stream to a service for the ComparisonContentAttribute according to the network situation.

When the receiver receives two instances within the same service (e.g., ABC drama) in the DVB-I service scheme, the DVB-I client should select an instance that may be provided for a better user experience. When the value of @ComparisonBitrate value is identified as 7 Mbps, the available bandwidth of the current network is exceeded compared to HD, and the attribute of @ComparisonContentAttribute is supportable by the terminal (receiver), an MPD may be requested and a better service may be received and provided to the user. The attribute indicates "beyond HD" based on @ComparisonBitrate (7 Mbps-HD), and means that a service that is enriched compared to the broadcast service instance may be provided.

Here, the bit rates of 1M BPS and 7M BPS may be example values. These values may be bit rates applied between services with different resolutions, such as UD and UHD.

According to embodiments, a use case is expanded as follows.

Instance 1. HD broadcast

Instance 2. UHD DASH with representations from SD to UHD, 1.5 Mbps to 33 Mbps (with an HD Representation at 7 Mbps). MinimumBitRate 1.5 Mbps; ComparisonBitRate 7 Mbps.

That is, Instance 1 indicates HD broadcast, and Instance 2 indicates UHD DASH. Instance 2 may be represented from SD to UHD and may have a bandwidth from 1.5 Mbp to 33 Mbps. In this case, the HD representation is 7 Mbps, the minimum bit rate is 1.5 Mbps, and the comparison bit rate is 7 Mbps.

A player capable of supporting UHD according to the embodiments may select Instance 2 when the bit rate is 7 Mbps.

A player capable of supporting HD without HEVC support according to embodiments selects Instance 1.

A player capable of supporting UHD and having a Wi-Fi link of 5.5 Mpbs speed according to embodiments selects Instance 1.

A player capable of supporting UHD and having a 3G mobile connection of 1 Mbps, at which a broadcast report cannot be received, according to embodiments may not have a connection fast enough to play a service, but may attempt to play the service.

A player capable of supporting UHD and having a 4G mobile connection of 2 Mbps, at which broadcast cannot be received, according to embodiments may select Instance 2.

Figure 10:
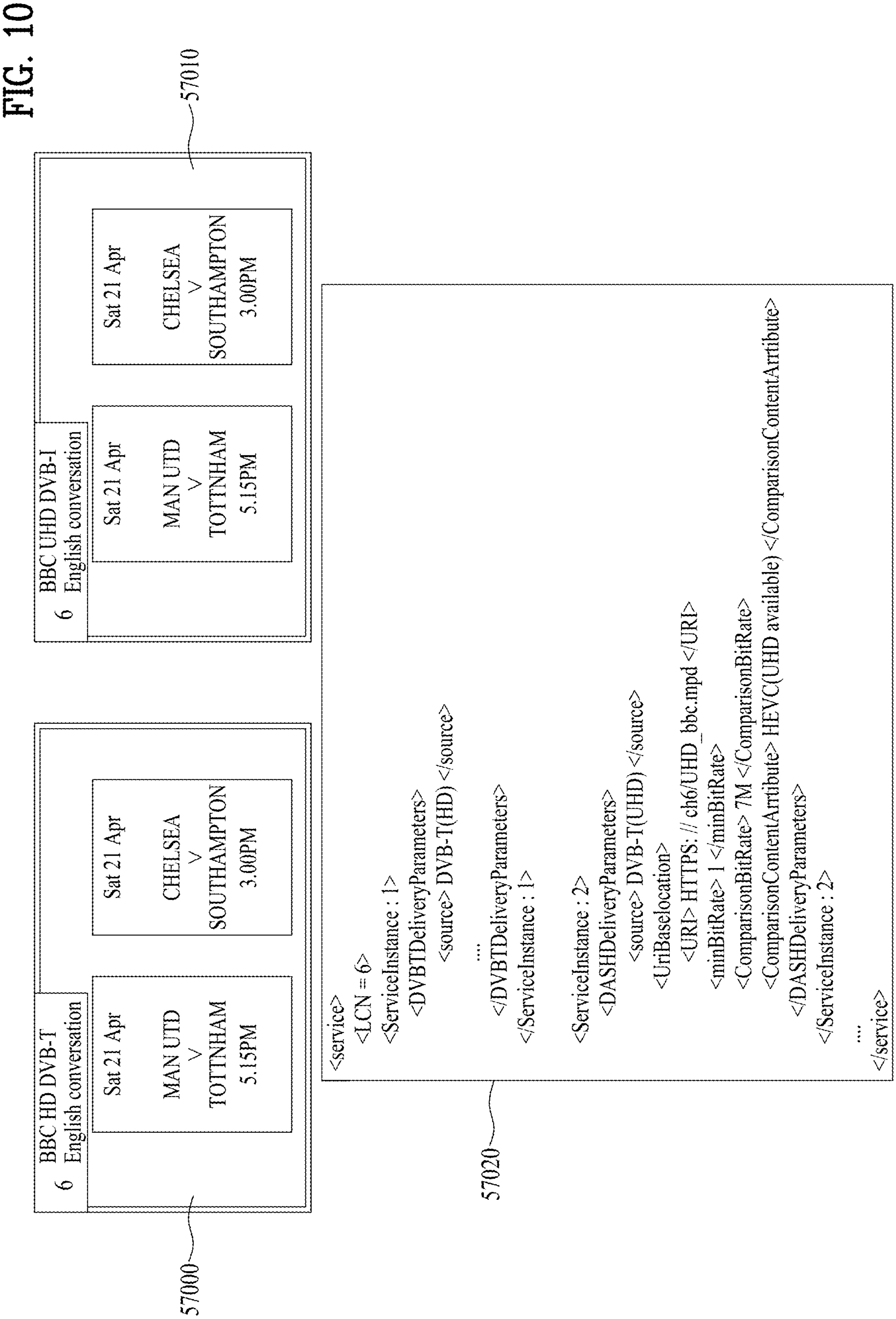
FIG. 10 illustrates a simulcast UI/UX according to embodiments.

FIG. 10 illustrates a simulcast UI/UX according to embodiments.

In the figure, part 57000 illustrates a state in which the reception device according to the embodiments displays the DVB-T broadcast service, and part 57010 illustrates a state in which the reception device according to the embodiments displays the DVB-I service. FIG. 14 illustrates that a better user experience for the same service is provided to a user according to a user's selection and/or a characteristic of the reception device, based on a signaling scheme and a UI/UX scheme according to embodiments.

Part 57020 is an example of the above-described signaling information for the aforementioned states. The example corresponds to the service list described above.

The service list according to the embodiments may provide a service instance for each service. The service for parts 57000 and 57010 has logical channel number 6, and includes service instance 1 and service instance 2. Service instance 1 signals DVB-T (HD) service as shown in part 57000, and service instance 2 signals DVB-I (UHD) service as shown in part 57010.

According to embodiments, when a device capable of receiving the DVB-I service receives one or more service instances, a determination may be made such that a media service of higher quality may be provided based on the comparison bit rate value and the comparison content attribute value included. When two service instances are received as in the embodiment, a service instance that is likely to receive a better service may be quickly identified through IP/DASH. As in the embodiment, when HD and UHD are simultaneously received, a delivery type may be selected through the information.

In other words, a reception device receiving Service Instance 1 and Service Instance 2 may immediately check a better DVB-I UHD service based on the comparison bit rate value and the comparison content attribute value included in the service instance for DVB-I, without having to parse all other signaling information for all services. Based on Instance 2, the reception device may recognize through the comparison content attribute that the comparison bit rate is 7 Mbps and the resolution of the better service is UHD (HEVC). The reception device may ask the user whether to view the better service based on UI/UX. The service according to Instance 2 may be provided to the user according to the user's selection or the setting of the reception device.

The reception device according to embodiments may provide a DVB-I simulcast service UI/UX to a user. The UI/UX shown in FIG. 57 represent a UI/UX that provides a better experience to a user when a DVB-I client receives multiple service instances through the extended information according to the above-described embodiments. For a terminal capable of supporting UHD/HEVC, a DVB-I service instance capable of receiving UHD may be selected in place of the DVB-T service instance capable of receiving HD. The terminal may select a service instance of high quality only through the service list scheme without having to receive all DASH MPDs.

The signaling information according to the above-described embodiments may be referred to as various terms such as field, attribute, element, first information, second information, first value, and second value.

The above-described embodiments and the embodiments to be described below may provide the following effects.

According to embodiments, an MPEG-2 system/DVB SI-based service for Internet channel scanning for providing the same user UX as the existing linear service channel may be initialized.

According to embodiments, network/stream/service unique signaling for Internet stream identification may be performed for aggregation with an existing linear channel.

According to embodiments, a method for replacing TSID in existing system information may be extended.

According to embodiments, switching of a DVB network provided on the same dedicated channel and each bit-stream provided on a DVB-I channel may be allowed.

According to embodiments, SUHD (8 k) linkage may be provided through a DVB-I channel in SD, HD, and UHD linkage services provided on an existing channel.

According to embodiments, a DVB-I service list may be acquired over the existing DVB network.

According to embodiments, in order to provide a linear IP-based TV service, a service bootstrap technology of the existing linear channel network.

According to embodiments, unique information that must be defined for Linear IP based TV service identification may be added.

According to embodiments, an IP based TV channel may be added to the existing linear channel EPG.

According to embodiments, an existing DVB stream and a DVB-I stream may be simultaneously provided on the same dedicated channel, and the streams may be dynamically changed for a predetermined period.

According to embodiments, SUHD (8 k) linkage may be provided through a DVB-I channel in SD, HD, and UHD linkage services provided on an existing channel.

According to embodiments, linkage information for acquiring a DVB-I service list or a query end point over the existing DVB network may be extended.

According to embodiments, a service bootstrap scheme for an existing linear channel network may be extended to provide a linear IP based TV service.

According to embodiments, linkage between the existing DVB network and the DVB-I network may be provided at the bouquet level, service level, and event level based on DVB-SI information.

According to embodiments, content of various resolutions may be provided on the same logical channel through linkage information about the existing DVB network and the DVB-I network.

According to embodiments, a DVB-I service list location and a query may be defined through a linkage descriptor (uri_linkage_descriptor) to acquire a DVB-I service list on the existing DVB network.

According to embodiments, an open DVB-I service registry may be accessed through an end point and a service list entry list suitable for a client may be acquired.

According to embodiments, a service that is accessed by a device supporting an RF-based DVB tuner through a UI in which an existing linear service and an OTT service are aggregated may be enabled.

According to embodiments, a media service that provides the same UX as existing linear channels may be provided through the open Internet without a set-top box (STB).

According to embodiments, as the existing DVB network and the Internet channel are aggregated, a resolution that may be provided on the same channel may be extended.

According to embodiments, a DVB-I service list location may be signaled due to a linkage descriptor (uri_linkage_descriptor). The reception device according to the embodiments may efficiently acquire a DVB-I service list. In addition, due to the end point according to the embodiments, the reception device according to the embodiments may efficiently acquire a service list.

Due to the above-described embodiments, the terminal (device) according to the embodiments may acquire a service list in which all channels are aggregated, as shown in FIG. 34. The aggregated service list may include an entire list, a list desired by the reception device, and the like.

A URI by which all services may be acquired may be present. Through this URI, a URI for a list of individual services may be additionally acquired. The individual list may be a list of services for each broadcaster.

As the service platform expands, operators may provide services through more diverse environments. From the user perspective, media services received in various app environments may be offered in an aggregated reception environment called DVB-I. Accordingly, services that are more convenient and have good accessibility may be received.

With the expansion and integration of the service platform, a service may be simulcasted over communication networks including terrestrial, cable, satellite, and 5G networks, and the receiver may receive a desired service according to the receiver capability.

This process may be implemented through ComparisonBitrate and/or ComparisonContentAttribute.

The MPD may contain multiple representations and also contain both UD related information and UHD related information.

The reception device has a large burden of parsing all the information of the MPD, which takes a lot of time.

On the other hand, when the DVB-I service list at the service instance level is used, the reception device may be allowed to selectively and quickly decode optimized services and rich media according to the capabilities of the reception device.

The reception device may recognize presence of services with different capabilities through ComparisonBitrate. ComparisonBitrate may be a concept of minimum throughput. Furthermore, the reception device may recognize a specific attribute of a switched service through ComparisonContentAttribute.

Figure 11:
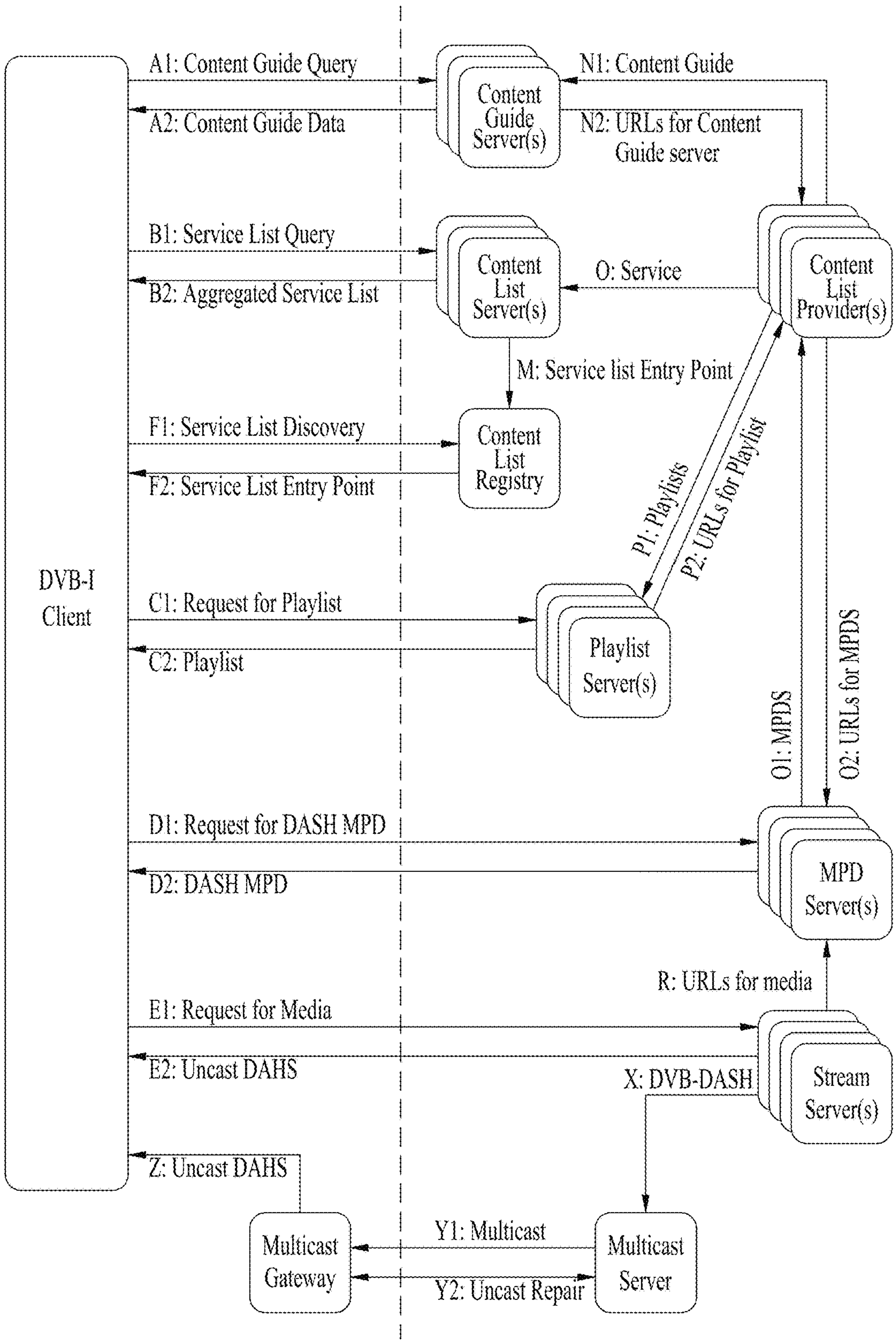
FIG. 11 shows a DVB-I model according to embodiments.

FIG. 11 shows a DVB-I model according to embodiments.

DVB-I Client: A DVB-I client, which corresponds to a media data processing device according to embodiments.

Service List Registry: May provide a list of service list servers to the client. The provision of the list may be performed based on query parameters.

Service List Server(s): A server that delivers service lists to the client. A separate service list server may aggregate service list fragments from multiple content and service providers.

Content Guide Server(s): may respond to requests from the clients for content guide data. Content guide servers for individual DVB-I services may be referenced in the service list entry for the service.

Content/Service Provider(s): may provide DVB-I services.

Playlist Server(s): may provide a playlist for services that reference a playlist of DVB-DASH content items rather than directly referencing a single DASH MPD.

MPD Server(s): may provide DASH MPDs.

Stream Server(s): may provide DASH media segments to the DVB-I client.

Multicast Server: A server for adaptive bitrate multicast.

Multicast Gateway: A gateway for adaptive bitrate multicast.

A1: Content Guide Query: A content guide query. This means a request from the DVB-I client to the content guide server.

A2: Content guide data

B1: A service list query. It is a request from the DVB-I client to the service list server. The DVB-I client may request a full list of services. The service list may be a locally filtered or pre-filtered list.

B2: An aggregated service list.

C1: A request for a playlist. It may be an HTTP GET request.

C2: A playlist.

D1: A request for DASH MPD. It may be an HTTP GET request.

D2: DASH MPD: A DASH MPD according to the ETSI TS 103 285 standard.

E1: A request for media. It may be an HTTP GET request.

E2: Unicast DASH: According to ETSI TS 103 285 [1].

F1: A request for determining the entry point(s) of the service list server(s). This request may support a query for performing a selection within a service list discovery.

F2: A list of service list entry points that match a request criterion.

N1: Content guide data.

N2: URLs of the content guide server. URLs for content guide data about each of the services of the service providers and the content contained in the service list entry for the service of interface O M: Registration of service list entry points with service list servers.

O: Service records. It is data about DVB-I services provided by a single content/service provider.

P1: A playlist.

P2: URLs for playlists. URLs are for playlists included in the service list entry for the service for interface O.

Q1: DASH MPDs according to the ETSI TS 103 285 standard document.

Q2: URLs for DASH MPDs included in the playlist for the service of interface P1 or the service list entry for the service of interface O.

R: URLs for media. This is URLs for media included in DASH MPDs.

X: may be a Pin' or Oin interface in the DVB A176 standard. It is information related to a flow of DASH media data to a multicast server.

Y1: Multicast. It may be interface M in the A176 standard. It may be information related to a flow of DASH media data on multicast.

Y2: Unicast repair. It may be information related to a flow of DASH media data on unicast for repairing data lost from interface Y1. It may be interface U in the DVB A176 standard document.

Z: Unicast DASH. It is interface related information from the DVB-I client to the multicast gateway according to ETSI TS 103 285 document. It may be interface L in DVB A176.

The DVB-I client, which is a media data processing device according to embodiments, may correspond to a DVB-I player, a TV device, a 2nd device, or the like.

In the DVB-I standard, interfaces F1 and F2 perform service discovery and receive service list entry points in response thereto. In addition, according to processes B1 and B2, a curated list may be received by reflecting the user's language, country, region, preference, and the like.

Thereby, service aggregation may be implemented. The DVB-I client may propose selection of service list servers and aggregate service lists from multiple service list servers.

DVB-I client may provide selection of service list servers and may aggregate service lists from multiple service list servers. In addition, the DVB-I client may make a first access after being installed, and perform processes F1 and F2 to show a list of lists of service list servers as follows:

1. The manufacturer of the device executing the DVB-I client may provide such devices.
2. National or regional regulators that provide information for the benefit of clients operating in the relevant countries and regions
3. Operators or platforms for clients
4. Central service list registry (CSR) that operates for the benefit of all devices running a DVB-I client that provides information about service lists.
5. A third-party service list aggregator.

There are methods to operate the service list registry as disclosed above. As in the fourth case, according to the function of DVB-I CSR, the DVB-I service list provider or service providers may register a service in the CSR and may display a list of registered lists according to the acquired information when DVB-I performs bootstrapping through F1. The user may select a service list based on the lists of the registered lists and directly handle the service list through filtering criteria such as user preference and country/language/region.

Extension of manufacturer service list repository-supporting service discovery entity The manufacturer service list supporting DVB-I service architecture shown in FIG. 33 includes a DVB-I client, a service provider, a streaming server, a CSR, and a service list provider repository. The role and receiver operation of each module are disclosed below.

DVB-I client: consists of a system client and a DASH engine, wherein the system client aggregates and curates several service lists through the service bootstrapping, service list discovery, and service manager. In addition, it manages a channel DB assigned in each service list, and performs content guide and app launching. The DASH engine receives HTTP and DASH delivery and performs decoding and rendering.

Service provider: Entities capable of providing content, including OTT companies such as Disney, Fox, Netflix, Hulu, and Amazon Prime, MNO or IPTV operators, and personal channel operators, provide content to list providers.

Service list provider repository: List providers curate lists and register the same in the DVB CSR.

CSR: The first bootstrap location of the DVB-I client, where the list of lists is managed.

Each interface has a function as described below.

[Interface 0]: List providers curate lists and register the same in the DVB CSR.

[Interface 1]: Mfr also operates a repository to manage a list, and registers the list in the DVB CSR.

[Interface 2]: After a DVB-I service is launched and a DVB-I service discovery query is sent, the interface shows list entries filtered according to user language, country, region, and postcode through a series of bootstrap processes. It receives service entities adapted to the user selection or environment and ServiceListURI for accessing the service entity repository.

[Interface 3-a]: Receives DVB-I service lists through ServiceListURI for accessing the service list repository.

[Interface 3-b]: Receives a service list of Mfr through ServiceListURI for accessing the service list repository.

[Interface 4-a]: Receives content by requesting a receivable instance of each service in the DVB-I service list

[Interface 4-b]: Receives content by requesting a receivable instance of each service in the DVB-I service list Embodiment 1)

https://csr.dvbservices.com/query?TargetCountry=ITA®ulatorListFlag=true

Figure 12:
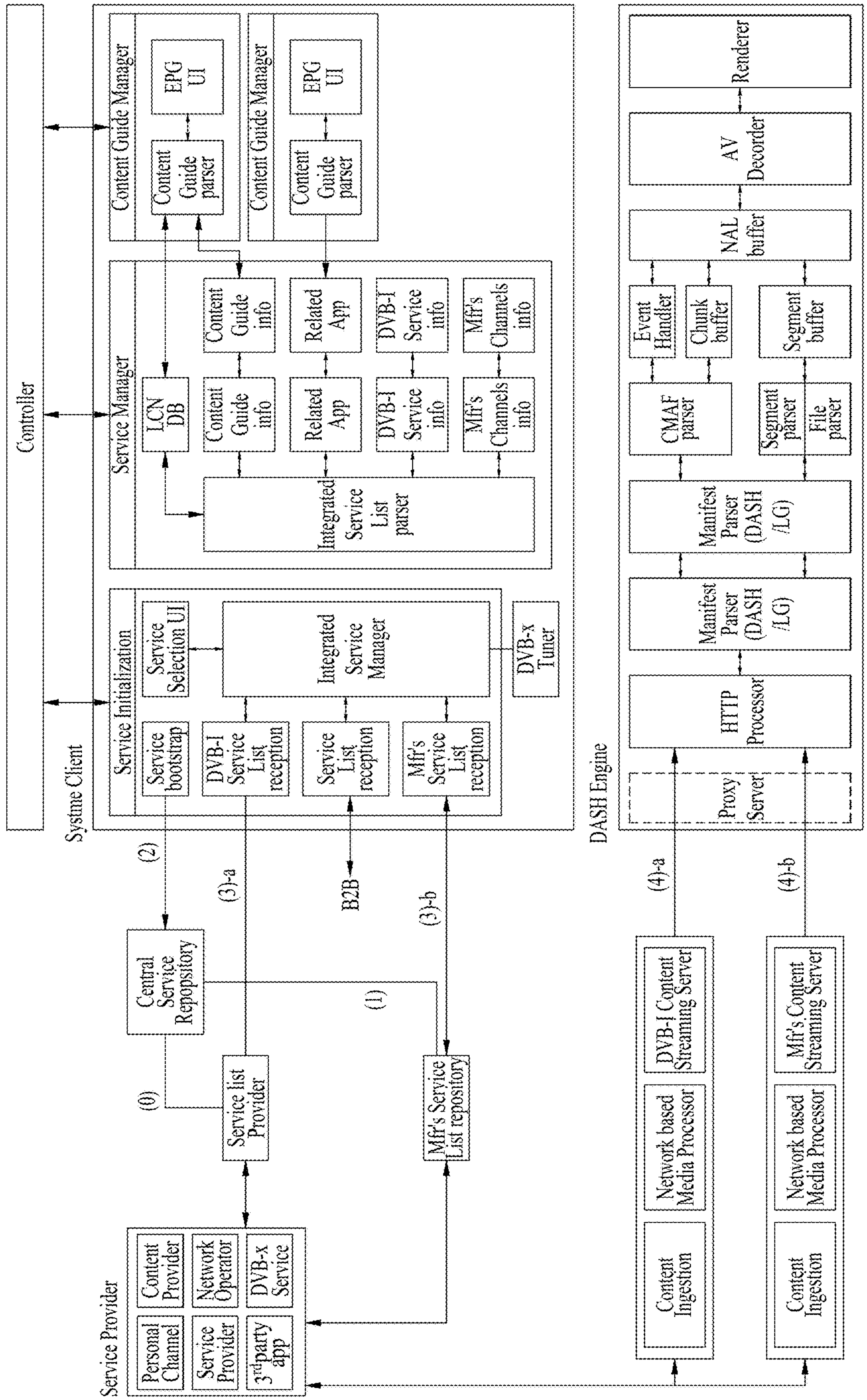
FIG. 12 shows a DVB-I service architecture for supporting a manufacturer service list according to embodiments.

FIG. 12 shows a DVB-I service architecture for supporting a manufacturer service list according to embodiments.

When the manufacturer implements the DVB-I client, the service list provider may serve to register Mfr service lists, collect the services, manage the entire registry, and curate a service list. A diagram of a service discovery architecture supporting these operations is shown in FIG. 12. Each component of FIG. 12 may correspond to hardware, software, a processor, and/or a combination thereof.

When a DVB-I service discovery query is sent to the CSR, the CSR provides DVB-I service discover data and ServiceListURI as follows. The DVB-I client accesses https://dvbi.TVfromTheWorld.com/engTVservices.xml to receive a service list.

```
<ServiceListURI contentType="application/xml">
<dvbisd:URI>https://dvbi.italian-authority.it/trusted-services.xml</dvbisd:URI>
</ServiceListURI>
```

Embodiment 2) https://dvbisr.private-service-list-registry.com/query?ServiceListName=LGchannels When a DVB-I service discovery query is sent to the CSR, the CSR provides DVB-I service discover data and ServiceListURI as follows. The DVB-I client makes an access through https://www.LgChannels/dvbmfr/UK/servicelist.xml to receive a service list.

```
<ServiceListURI contentType="application/xml">
<dvbisd:URI>https://www.LgChannels/dvbmfr/UK/servicelist.xml</dvbisd:URI
>
</ServiceListURI>
```

In this case, the DVB-I service discovery information may be composed of information disclosed below, and each service list entity may be defined.

FIG. 13 shows DVB-I service discovery information according to embodiments.

The DVB-I service list discovery scheme may define provider offering information that provides service list registry and a service list as described above. As shown in FIG. 18, in providing a service as a separate mfr-only service provider entity, the offering information of mfr in service discovery and information for querying whether the service list provided by mfr is receivable should be extended. It is necessary to extend the capabilities information for checking whether the Mfr service list can be supported. The syntax shown in FIG. 35 may be extended using the extension in the current DVB-I service list discovery scheme.

FIG. 14 shows the syntax of a service list registry entity according to embodiments.

OSName: Supportable OS version and name

ServiceCode: Supportable service code within the device

TargetLocation: A target location where the device is made, e.g., UK, Nordic

Sourcelocation: A location of a streaming server that provides each service

PublishedDate: Service list publish data

ReleasedDate: Service list release data

Manufacturer: A service list implementation company

ManufacturerURL: URL of the service list implementation company

ServiceDescription: A brief description of the service list. Example: List indicating text ServiceReport: A service list issue or consumption report FirmwareUpgrade Version: Firmware version number that the platform should support UpdateLocationURL: URL accessible for firmware update ServiceAvailability Version: The current version in which the service list is provided.

ServiceAvailabilitySearchURL: URL for moving to a web page where service search is available such that additional services provided by the service list provider may be added ServiceAvailabilityDBUpdateURL: Link URL for service data base update. Schema to support XML update based on IETF RFC 5261 is downloaded, and fetching may be performed through the corresponding information.

FIGS. 15A and 15B show semantics of a service list registry entity according to embodiments.

Figure 16:
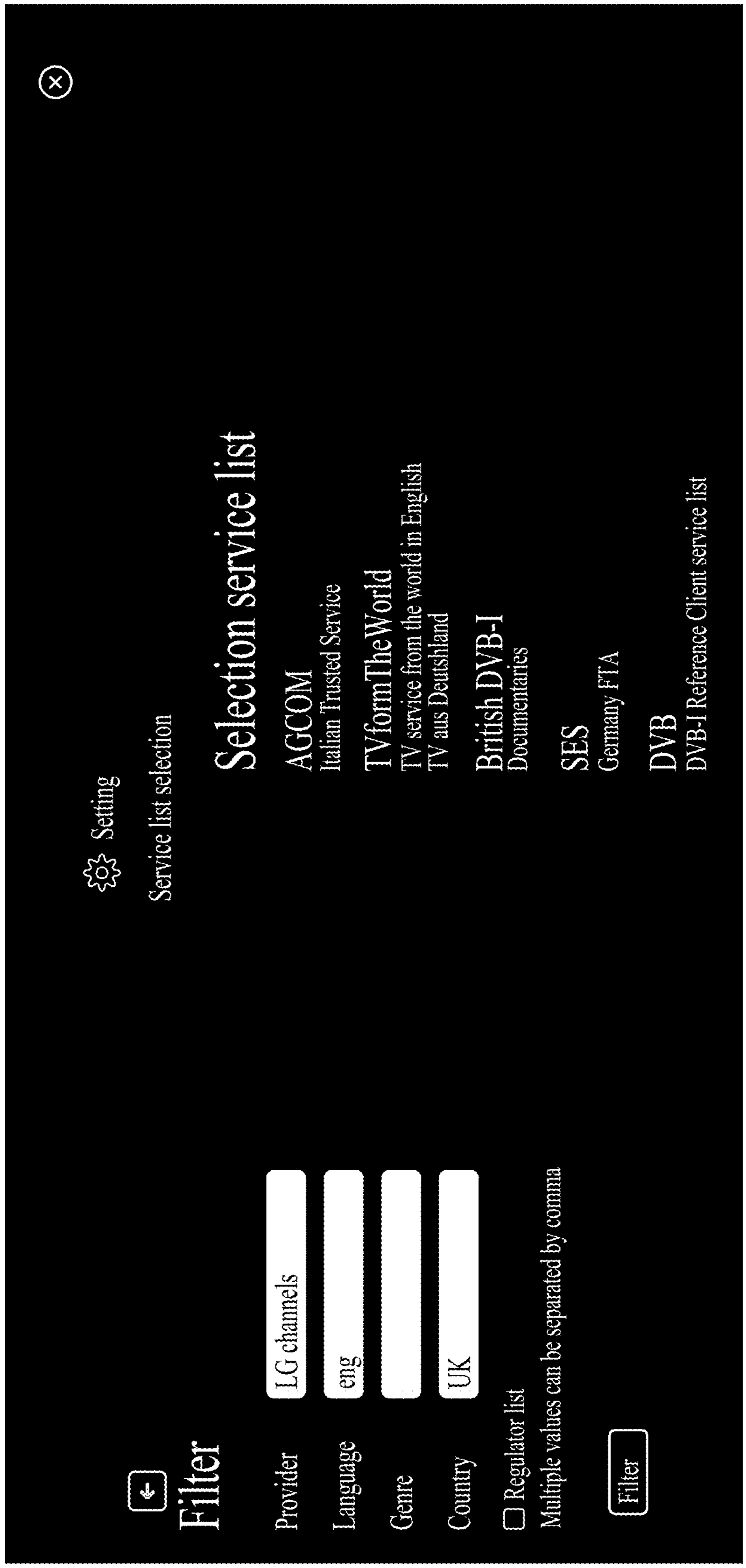
FIG. 16 illustrates a service list selection UI/UX according to embodiments.

FIG. 16 illustrates a service list selection UI/UX according to embodiments.

According to the semantics and syntax according to the embodiments, the media data processing device according to the embodiments may display service list related information as shown in FIG. 37.

Regarding the service list, a service list may be selected based on a provider, language, genre, country, and the like.

A service discovery entity supporting a manufacturer service list repository may be added, and a specific manufacturer service list may be filtered through a provider. As in the embodiment, the UK supported LG channels service may be consumed.

FIG. 17 illustrates a method for coping with channel conflict in receiving multiple service lists according to embodiments.

Channel conflict issue when multiple service lists are received

DVB-I receives service list-based services, and each service list is operated and managed by a specific repository. The repository providing the existing DVB broadcasting list may define the DVB-I service list using the LCN allocation method based on the country or specific region due to the characteristics of the current European broadcasting service. On the other hand, specific DVB-I service list providers collect independent services regardless of region and define the LCN list, and accordingly LCN allocation may be set as desired by the service list provider. Therefore, in this background, there is a potential issue of channel conflict when the DVB-I client receives and aggregates multiple service lists.

Use case 1 distinguishes a service list and each Service ID, an LCN to be assigned to the service list, an LCN used on the legacy TV, and actual content, and means that the services and channels assigned to each service list are allocated. In Use case 1, when different lists List A and List B are received, the Sid/LCN are all allocated identically and the contents are the same. Accordingly, when the four service lists are aggregated, the service may be provided without an issue.

Case 2 is the case of multiple service providers+different service IDs+the same LCN. This is a case where different services are allocated to one LCN and thus a conflict occurs therebetween.

Case 3 is a case of DVB-T+multiple service providers+same service ID+different LCNs. This case may occur when a hybrid environment of DVB-T and List A and multiple service providers have the same service ID assigned, and service list C is assigned the same LCN.

Case 4 represents a case of multiple service providers+different service IDs+same LCN, and may occur when the local country/region service list and the immigrant's country list are aggregated.

In the cases according to the embodiments, there is a potential LCN conflict issue when service lists are merged. In order to address this issue, the DVB-I standard is extended as follows such that the media data processing device according to the embodiments may perform reasonable allocation without LCN conflict.

Figure 18A:
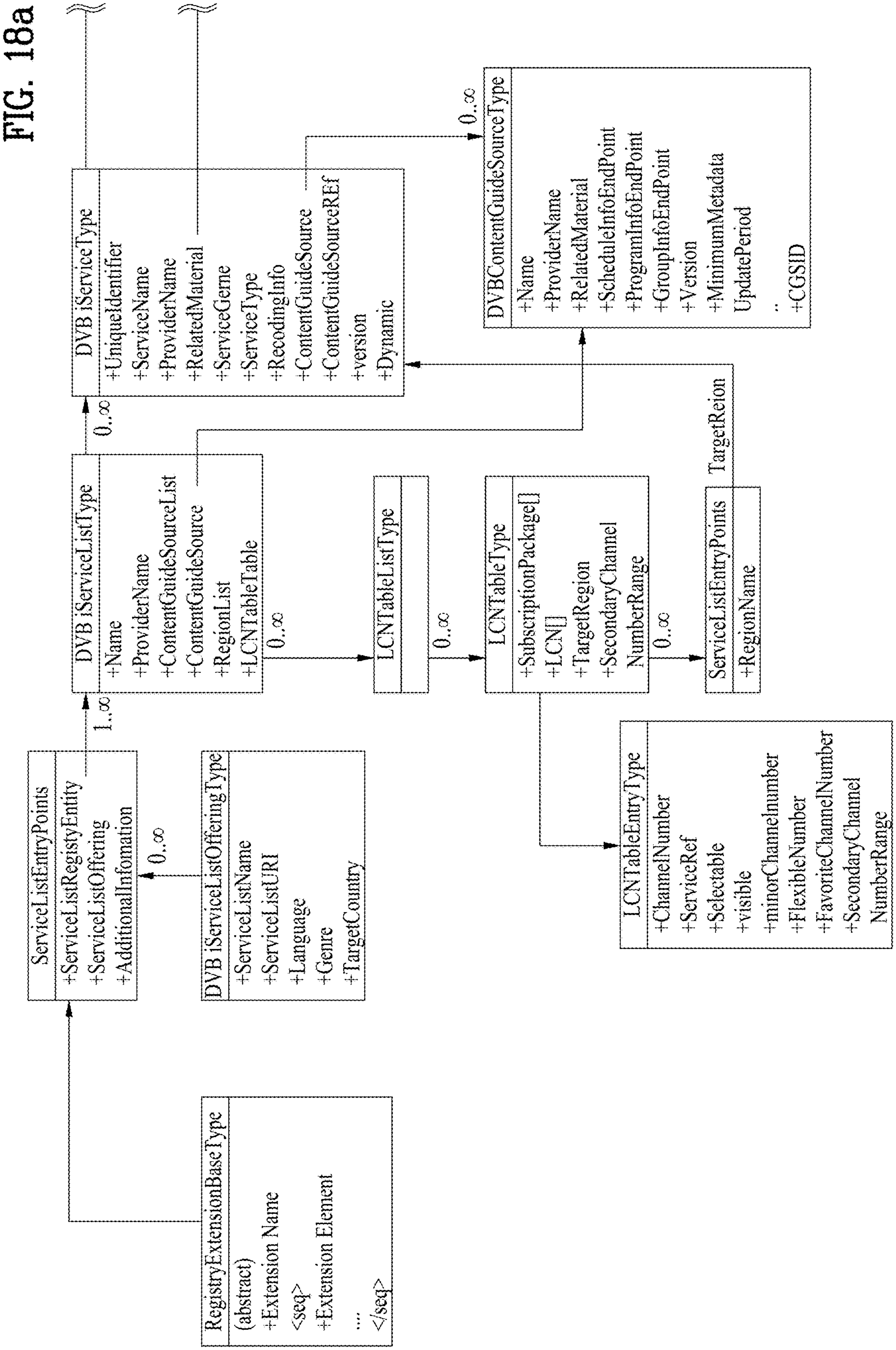
FIGS. 18A and 18B show an LCN table entry type extension according to embodiments.
Figure 18B:
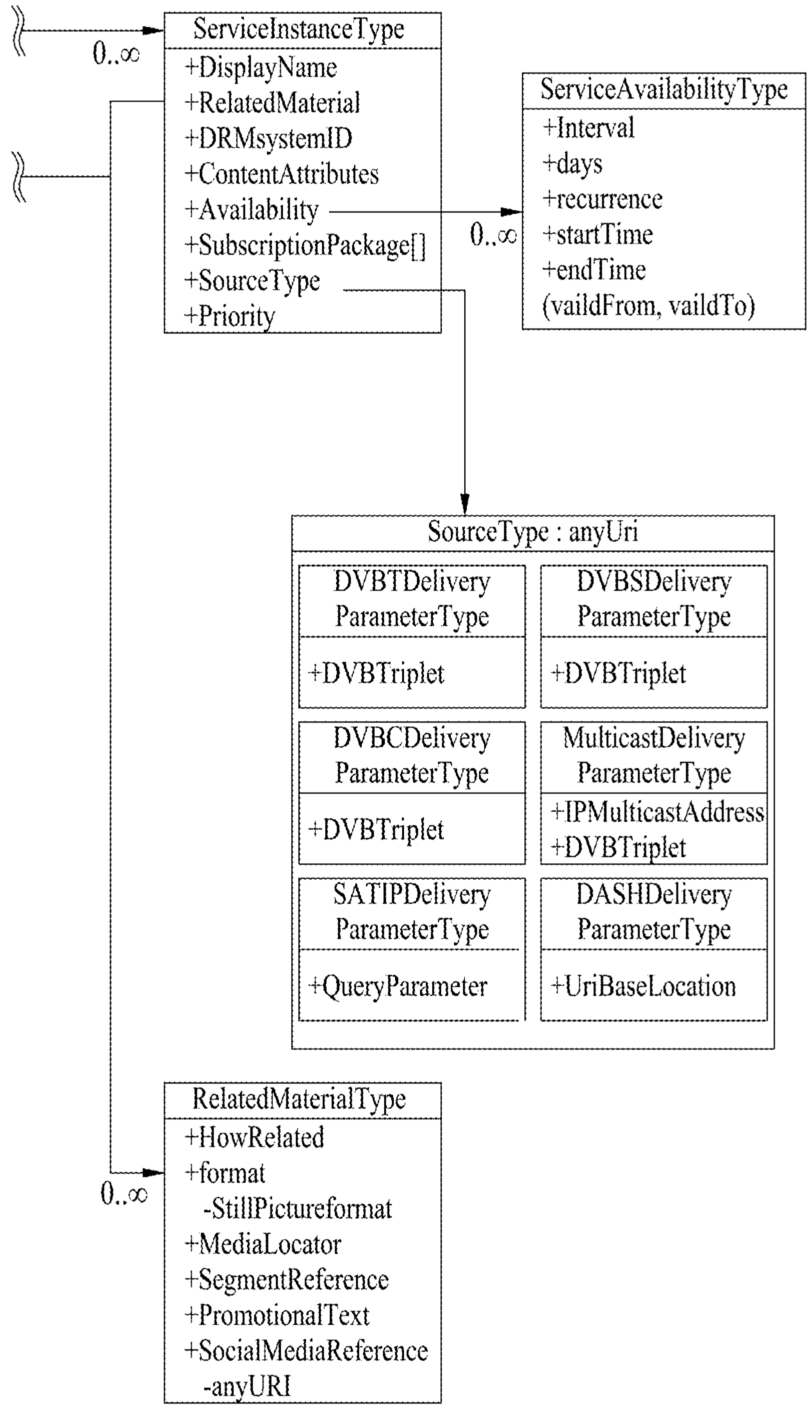

FIGS. 18A and 18B show an LCN table entry type extension according to embodiments.

A service list integration operation is performed by an integrated service manager that receives and integrates DVB-I service lists according to embodiments. An LCN table received through a country/region or a meaningful package is defined through a target region or a subscriptionPackage in each received service list. In FIGS. 28 to 29, when a conflict occurs due to extension of the LCN table, allocation of a reasonable integrated channel may be enabled through corresponding information. Details of XML xsd are disclosed below.

The transmission/reception method/device according to the embodiments may address the issue of channel conflict occurring in receiving multiple service lists, based on the element(s) included in an LCN table described below. The transmission device according to the embodiments may generate and transmit information including element(s) included in the LCN table, and/or may allocate and manage an integrated channel through the integrated service manager (which may be referred to as a manager, a controller, or the like) that receives and integrates DVB-I service lists included in (or connected to) the reception device according to the embodiments. In addition, the processor according to the embodiments may control the service list integration operation based on a memory that stores an instruction for the integrated channel allocation operation according to the embodiments, a controller, or the like. The LCN table may be referred to as LCN information or the like, and the elements included in the LCN table may be referred to as first information, second information, and the like.

FIGS. 19A and 19B show LCN table entry syntax according to embodiments.

The priority of the service list is set based on the region or country selected by the user for the first time, or a geographical region at the time when the DVB-I client is currently installed. In addition, when services are integrated, it is considered as a lower priority. The receiver may store the list as a prioritized list to manage lists received later.

The DVB-I client may provide a channel allocation guideline to the user using the corresponding information, and the channel number may be directly reassigned according to the user's intention.

When a user living in Switzerland receives service list 1, which is a Swiss service list, and the DVB-I client receives an additional list, service list 2, ServiceRef information connected to a unique identifier within each DVB-I service and a channel number to be displayed on the screen are received. When the allocated channel number=0 of the two lists is defined as the same number and thus a channel conflict occurs, the DVB-I client has a problem in processing the same channel. In this regard, the channel duplication issue may be addressed by allocating number 1000 through the favorite channel information extended in the present disclosure.

FIG. 20 shows an example of resolving service channel conflicts according to embodiments.

As described above, the DVB-I client may address the issue of channel conflict while newly allocating 1000 to an issue occurring on (channel 0, Sid23) in service list 2.

Embodiment 2

As in Embodiment 2, when service list 1 and service list 2, and n lists, which are user's local lists, are received, a conflict may occur among channel numbers 100 to 108. When it is assumed that service list 1 has a higher priority based on the user's residential area, the conflicting channel number of Service list 2 needs to be reallocated. In this case, for the conflicting channels, the conflicting channel numbers may be reallocated through the information of SecondaryChannelNumberRange. As shown in the result, conflicting channel numbers 100 to 108 may be newly allocated starting from number 1000 according to the SecondaryChannelNumberRange.

FIGS. 20A and 20B illustrate an example of resolving a channel redundancy issue according to embodiments.

When there is the same overlapping channel as in the embodiment, a channel may be allocated to an unassigned number during a specific interval according to the definition of SecondaryChannelNumberRange. In this regard, when the channel number ordering is assigned to an unassigned channel within the SecondaryChannelNumberRange:

(1) the values of SecondaryChannelNumberRange may be mapped in ascending order of ChannelNumber that requires reallocation due to a channel conflict; or (2) if it is difficult to define the values in ascending order or if ChannelNumber is not defined correctly, the leading number or string sequence may be sequentially allocated in alphabetical order based on the string value of ServiceRef in a single list according to order of reception in the DVB-I client.

Also, when channel information is defined for both FavoriteChannelNumber and SecondaryChannelNumberRange, which are information that may be reassigned when channels overlap, the channels are allocated by assigning a higher priority to FavoriteChannelNumber than to SecondaryChannelNumberRange.

Figure 22:
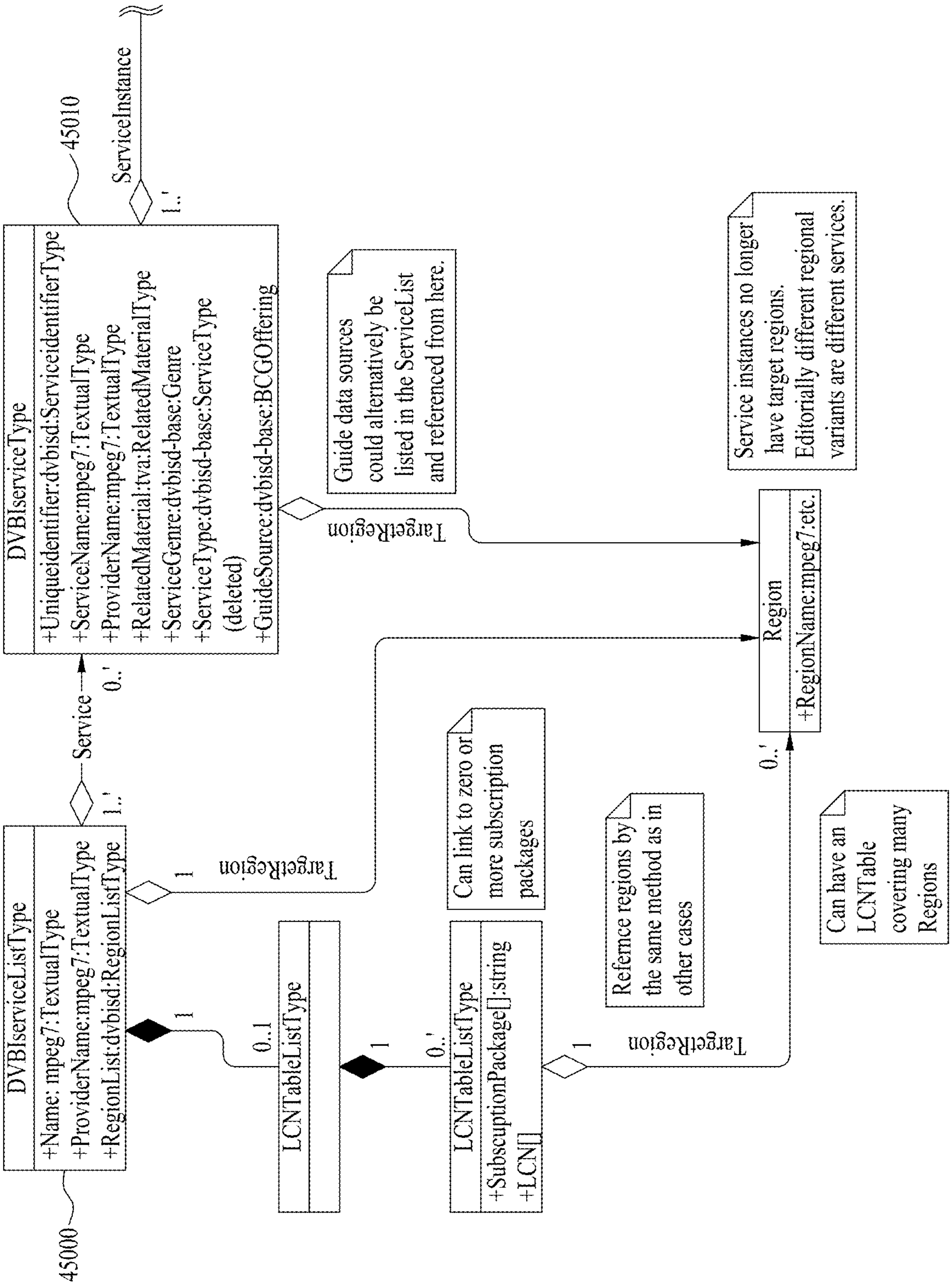
FIG. 22 shows a service list hierarchy according to embodiments.

FIG. 22 shows a service list hierarchy according to embodiments.

FIG. 22 shows a service list hierarchy for the service scenario of FIG. 1.

A DVB-I service list may include services, and each of the services may include service instances. Multiple service instances may be defined for each delivery network, and uniqueness may be distinguished by the URN of source_type.

The DVB service list type 45000 may reference the DVB-I service type 45010 for each service. The DVB-I service type 45010 signals Related Material and Guide Source. The DVB-I service type 45010 may reference a service instance type 45020 for each service instance. The service instance type 45020 signals the source type for the subscription package and URN for the Related Material. It may reference at least one of a delivery parameter type for DVB T/S/C, an RTSP delivery parameter type, a multicast delivery parameter type, or a DASH delivery parameter type.

The proposed source type URNs 45030 provide URNs for DVB T/S/C/I [TV/DASH, etc.

The DVB service list type 45000 references the LCN table list type, and the LCN table list type references the LCN table type. The LCN table type, DVB service list type 46000, and DVB-I service type 45010 may reference the Region. The related region information may vary among services.

FIGS. 23A and 23B show service list offering fields according to embodiments.

A media data processing method and device according to embodiments may acquire DVB-I service list logos from the service list restry (SLR) (DVB-I service list logo in SLR) and efficiently process and provide the same.

The media data processing method and device according to embodiments may include a method of providing a graphical element through a service list selection UI.

A DVB-I client, which is the media data processing device according to embodiments, may retrieve a service list matching a desired criterion through a service list registry. A minimal UI may be configured with a service list name, a service list provider name, a service list genre, and a regulator list flag, but this is merely a "text" UI.

To provide the service list logo for a selection UI, the client retrieves all service lists provided in the response (using <ServiceListURI>), extracts the URI for the service list logo, and obtains the logo. While this approach may work for connected clients, it does not work in other situations (e.g., a situation where broadcasts are used).

Accordingly, the method/device according to the embodiments may include and perform a method of delivering the service list logo URI or image itself in the service list registry response using an approach similar to that used in the service list.

To address the issue of not being able to provide a graphical element for a service in a "broadcast" service selection UI, the method/device according to the embodiments may update the service list offering in Example 1). Related material may be delivered along with the service offering.

```
ServiceListOfferingType
<complexType name="ServiceListOfferingType">
<sequence>
<element name="ServiceListName" type="mpeg7:TextualType"
maxOccurs="unbounded"/>
<element name="ServiceListURI" type="dvbisd:ExtendedURIType"
maxOccurs="unbounded"/>
<element name="Delivery" type="dvbisld:DeliveryType"/>
<element name="Language" type="tva:AudioLanguageType" minOccurs="0"
maxOccurs="unbounded"/>
<element name="Genre" type="tva:GenreType" minOccurs="0"
maxOccurs="unbounded"/>
<element name="TargetCountry" type="dvbisd:ISO-3166-List" minOccurs="0"
maxOccurs="unbounded"/>
<element name="RelatedMaterial" type="dvbisd:RelatedMaterialType"
minOccurs="0" maxOccurs="unbounded"/> or
<element name="RelatedMaterial" type="dvbisd:RelatedMaterialType"
maxOccurs="unbounded"/>
</sequence>
<attribute name="regulatorListFlag" type="boolean" default="false"/>
<attribute ref="xml:lang"/>
</complexType>
```

ServiceListName is the name of the service list in a human readable form. It may specify multiple names of service lists with different values of @xml:lang.

ServiceListURI is the URI where the service list may be retrieved. Multiple URIs can be specified if the same service list can be obtained from different servers.

Delivery identifies the delivery methods used to deliver the services in the service list. It indicates a delivery method required in order to offer an acceptable experience, as defined by the service list provider. This enables a client to determine if all required delivery sources are available before attempting installation of the service list.

Language is the audio language of the service list's services. Multiple language elements can be specified in case of multilingual contents. If no language is specified, responses to service list registry queries shall include the service list offering.

Genre is the genre of the contents available for the service list according to the TV-Anytime standard. If no genre is specified, responses to service list registry queries shall include the service list offering. A finer grain approach is possible by specifying the Genre at the service level (ServiceList.Service.ServiceGenre). Similar to ServiceGenre, possible values are taken from: ContentCS defined in ETSI TS 102 822-3-1, FormatC defined in ETSI TS 102 822-3-1, and ContentSubject.

The country code or a list of country codes indicating the countries where the service is intended to be received. If not specified, no regional constraints exist and the service can be received anywhere.

RelatedMaterial is additional material related to the service. It is used to signal service logos.

@regulatorListFlag is a Boolean value indicating if this is the "default list" for a country (e.g., according to the List of EU Audiovisual Regulators). If not specified, the default value is false.

@xml:lang specifies the natural language when not explicitly provided in a multilingual element.

Further, the method/device according to the embodiments may update the service listing logo definition to allow for 2) 'in-band' media.

Service list logos according to embodiments include the followings. The logo for a service list is represented in a single RelatedMaterial element in the service list as follows. Logos for service lists are signaled by a HowRelated element with an @href attribute passing the value urn:dvb:metadata:cs:HowRelatedCS:2021:1001.1. The MediaLocator element according to embodiments further includes the following elements. The MediaLocator may include a MediaUri element, wherein the value of the MediaUri element may include a URI for an image file, and the @contentType attribute may further include a MediaUri element carrying the image media type (MIME type). Also, the value of the MediaUri element may include a URI for an image file and the @contentType attribute may include a MediaUri element carrying the image media type (MIME type). In addition, the value of the MediaUri element may include may include encoding of a service logo according to IETF RFC 2397, and the @contentType attribute may include a MediaUri element carrying an image media type (MIME type). Further, the MediaLocator element according to the embodiments may include an InlineMedia element, wherein the value of the InlineMedia element may include base 16 or base 64 encoding of the service logo according to ISO/IEC 15938-5.

Delivering the encoded image in this way may result in a very large XML document. It is recommended that a dereferenceable URL be provided to ensure maximum compatibility. When the IETF RFC 2397 data URL is used to deliver a logo, the media type of the URI should always be specified and match the value of the @contentType attribute. Base 16 encoding may not be widely supported.

Even when the RFC 2397 data URL contains a media type in that format, it may still be useful to the application if the @contentType attribute carries the same value. The use of InlineMedia may not be restricted to service list registry responses (i.e., it may be allowed in the service list).

Multiple service list logos may each send a signal the presence of the MediaLocator element in the RelatedMaterial element. One or more service list logos should be provided along with a media type image/jpeg or image/png for compatibility; other image formats, including image/webp, may optionally be provided. The DVB-I client may request that the image be resized to a different resolution or shape prior to delivery.

The DVB-I client, which is a media data processing device according to embodiments, may perform methods for efficiently processing InlineMedia.

In performing inband media transmission, embodiments may include a method of delivering MediaUri, and a method of transmitting in-band encoded media data in XML. Compared to delivering MediaUri, InlineMedia include advantages and disadvantages as follows. It has the following advantages. The media may be managed in a single XML file rather than using external resources. Also, faster delivery may be implemented by reducing the number of requests because there is only one file. The file may be reduced by HTTP header data. Further, in the case of static logos, embedding and provisioning them in XML may enable faster decoding and rendering for configuration of the UI/UX on the screen. However, there are disadvantages as follows. Base64 encoding may increase the size by one-third, and memory may be lost for images that are larger than the HTTP header data. In addition, when multiple image data are contained, the size of the Png/jpeg+optional image XML may be increased. Further, unnecessary data should be cached for a UI region that does not provide any images. While HTML is deleted upon leaving the page, XML may need to be cached semi-permanently for service list offering.

From the DVB-I client perspective, when the InlineMedia attribute is added, the RFC2397 data URI scheme may be used as the value of the src attribute of the img element to directly handle base-64 encoded image data. However, this XML provisioning does not take into account the UI/UX of the DVB-I client and may lead to large XML sizes. This increase in XML size is detrimental in terms of memory optimization of the DVB-I client. Therefore, to address this issue, a DVB-I media data processing method/device according to embodiments may provide the following methods The DVB-I media data processing method/device according to the embodiments may include and perform a hybrid type of XML provisioning considering the DVB-I client UI/UX based on all the characteristics of in-band signaling as follows.

For example, the DVB-I media data processing method/device according to the embodiments may define a method of accessing the service list registry with a combination of <ServiceListRegistryEndpoint> and a query string follows.

<ServiceListRegistryEndpoint>?<parameter1>=value1&<parameter2>=value2

Under this structure, <IinlineMedia>=value or an <inlineImages>=value may be added to the ServiceListRegistryEndpoint as a query string. For a region that does not need to be displayed in consideration of the UI/UX of the DVB-I client, this determination of the value of InlineMedia may include an external resource link as in conventional cases. If the DVB-I client determines the number of images for the initial screen or the required region and requests InlineMedia, unnecessary memory consumption may be reduced and the same quality of screen configuration may be achieved without any issues with the existing screen configuration.

For example, in a structure such as <ServiceListRegistryEndpoint>?<parameter1>=value1&<parameter2>=value2, <inlineMedia>=set/false or <inlineImages>=set/false may be added as a flag to the query string. "Set" indicates that images for which all <inlineMedia> are base 64-encoded may be included in the XML and transmitted, while "false" indicates that base 64-encoded images are not included and only mediaURI forms are included. This embodiment may enable screen configuration with only one file by including base64-encoded images in the XML and transmitting the same in unidirectional delivery environments, such as broadcasting with no connection to external resources.

Figure 24:
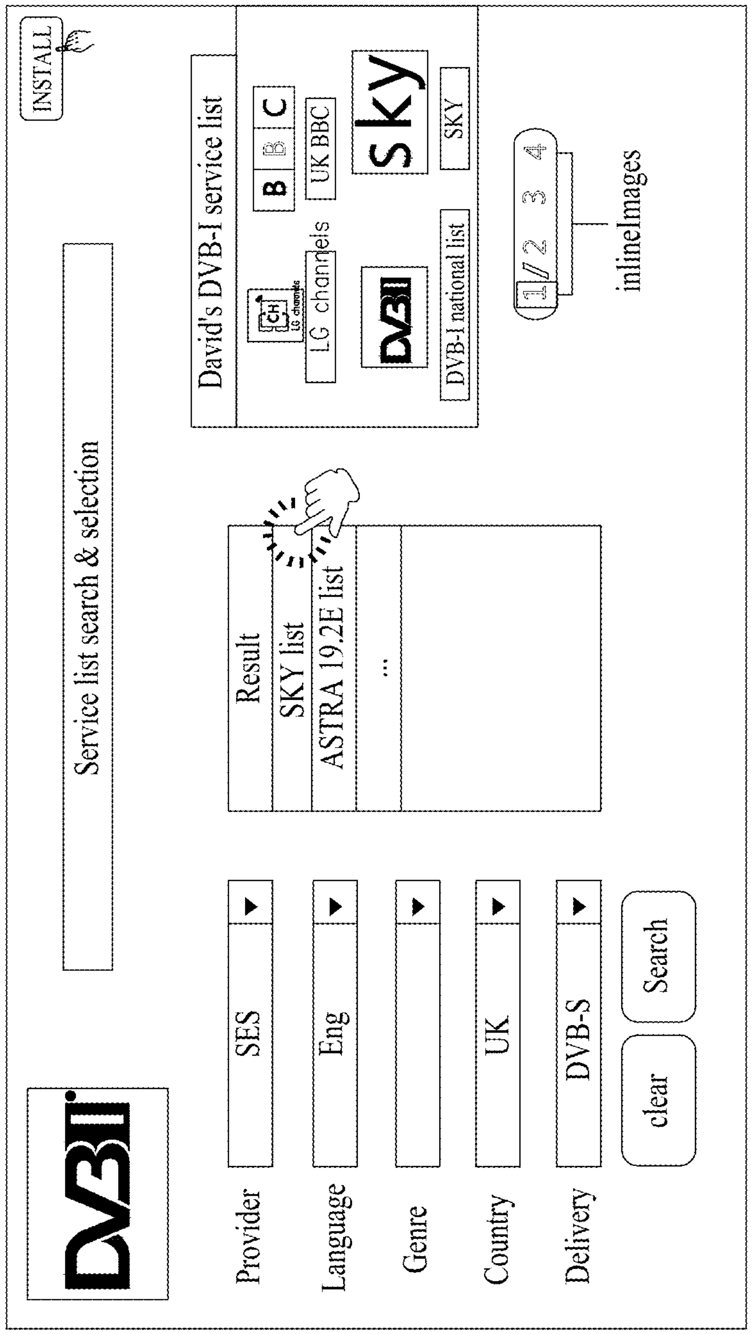
FIG. 24 illustrates a service list registry request from a client and a UI/UX configuration for service list search and selection in response to the request according to embodiments.

FIG. 24 illustrates a service list registry request from a client and a UI/UX configuration for service list search and selection in response to the request according to embodiments.

FIG. 24 illustrates an example of configuring a UI/UX by requesting service list discovery between a media data processing device that is a DVB-I client and a service list registry, and acquiring a service list entry point in response according to the embodiments of FIGS. 11 and the like.

FIG. 24 may also be performed in the process of acquiring a service list query and a service list or the process of acquiring a content guide query and acquiring content guide data in FIG. 11.

For example, a client may request a service list registry in the following process.

1. DVB-I client: Determines the number of image frames to be displayed for the user in the UI/UX to be configured. The determined number may be included in the Query condition when requesting the service list registry.
2. DVB-I client: May generate a query string, such as ABCserviceList.com/query?TargetCountry=ITA®ulatorListFlag=true&InlineMedia=4, to request the service list registry repository.
3. Service list registry repository: inlineMedia provisions XML containing only four images and return the same to the DVB-I client.
4. DVB-I client: In the received XML, the images of the inlineMedia may be base64-decoded to organize the images. Where there are multiple pages, the images to be passed to pages 2, 3, and 4 may be delivered in the form of a link (mediaURI), which is the conventional method.

The client may generate and provide the service list search and selection UI/UX to the user as shown in FIG. 24. The UI/UX on page 1 includes a DVB-I service list for the user, and the service list may be generated as inline media or inline images. The client may query and receive a return of service list images directly as inline media, thereby allowing UI/UX to be configured quickly and easily even with the XML transmission process alone.

For example, the client may request the service list registry as follows.

1. DVB-I client: According to the appropriate determination of the DVB-I client, <inlineImages> may be processed as a set and a request may be made to include all base64-encoded images in the XML.

2. DVB-I client: ABCserviceList.com/query?TargetCountry=ITA®ulatorListFlag=true&inlineImages=set
3. Service list registry repository: inlineImages contains only images and provisions the XML and returns the same to the DVB-I client.
4. DVB-I client: The images from the inlineImages in the received XML may be base64 decoded and used for screen configuration.

According to embodiments, the following technical issues may be addressed: When the DVB-I service is actually commercialized, the XML processing load on the client side may be high and burdensome because it may be assumed that inlineMedia in all lists will be encoded if there is no filtering method at the service list discovery stage. The filtering method refers to operations of a client including generating and transmitting a query based on inlineMedia/image information according to embodiments and filtering and acquiring path information or inlineMedia/images: <ServiceListRegistryEndpoint>?<parameter1>=value1&<parameter2>=value2.

Thus, to avoid the aforementioned issues, the DVB-I client may apply filtering to all media by excluding inlineMedia in the service list discovery stage. In this case, memory management may be facilitated depending on the UI/UX implementation on the client side. For example, memory optimization may be achieved by creating an implementation situation in which images that does not need to be requested according to the UI/UX are not pre-cached.

The query operation for filtering according to embodiments may be performed in an initial stage at which the client queries the list of service lists in FIG. 11. Thereby, the client may receive the necessary filtered information of the inlineMedia and media path information in the initial service discovery stage. Since the provider side has the advantage of reducing server memory by transmitting the inlineMedia/image to the client, but the client has a burden on the memory as it should receive and cache the inlineMedia/image, the filtering operation for both the provider and the client may overcome all the aforementioned technical issues and limitations.

FIG. 25 illustrates a service list registry request from a client and a UIIUX configuration for service list search and selection in response to the request according to embodiments.

Like FIG. 24, FIG. 25 illustrates a service list registry request from a client and a UIIUX configuration for service list search and selection in response to the request according to embodiments. However, unlike FIG. 24, this figure is an example of XML encoding when inlineImages=false. Thus, as shown in FIG. 25, the client receives a response in the form of URI and may acquire an image or media through the URI.

Figure 26:
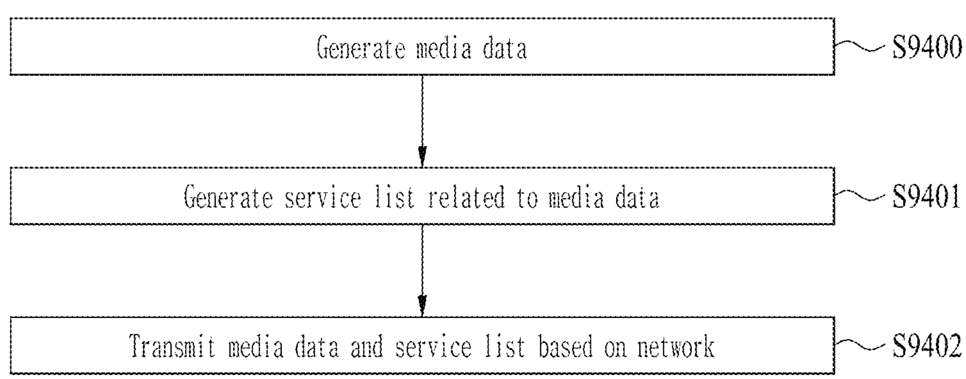
FIG. 26 shows a media data transmission method according to embodiments.

FIG. 26 shows a media data transmission method according to embodiments.

S9400: A method of transmitting media data according to embodiments may include generating media data.

S9401: The method of transmitting media data according to the embodiments may further include generating a service list related to the media data. The service list may represent signaling information for discovering the media data (or service, service data). The service list information may represent the information of FIGS. 11, 39, and the like. The service list information may include the information of FIGS. 11 to 17. Based on this information, the method/device according to the embodiments may display service instances, delivery types, and resolution through the UIUX, as shown in FIG. 18.

S9402: The method of transmitting media data according to the embodiments may further include transmitting the media data and the service list based on a network. The media data may be transmitted based on a network and protocol as shown in FIGS. 1 to 3. The transmission method/device according to the embodiments may include content guide servers, service list servers, service list registries, content/service providers, playlist servers, MPD servers, stream servers, a multicast server, a multicast gateway, and corresponding operations, as shown in FIG. 32. Content may be a unit of data included in a service. The media data may be construed as any term including service and content. A device performing the transmission method according to the embodiments is shown in FIG. 33. The service list may provide information for the operations of FIGS. 39 to 42 to prevent channel conflicts on the receiving side when multiple service lists are transmitted. In addition, in order for the client to provide a service list logo to a user, relevant information and data are required. In the process of the client transmitting a query to the registry and receiving a response, the logo image may be delivered as an encoded image to enhance efficiency. Further, image path information may be provided. Depending on client performance, the path may be acquired or the encoded image may be received as XML. To this end, combining filtering query strings may be supported.

Figure 27:
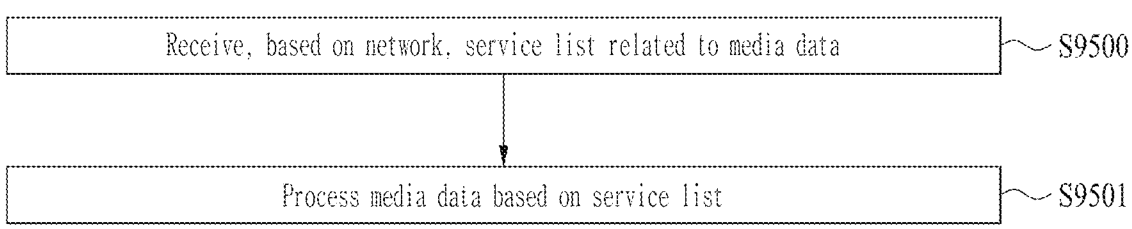
FIG. 27 shows a media data reception method according to embodiments.

FIG. 27 shows a media data reception method according to embodiments.

S9500: A method of receiving media data according to embodiments may include receiving, based on a network, media data and a service list related to the media data. The media data may be received based on a network and protocol as shown in FIGS. 1 to 3. The service list information may represent the information of FIGS. 11, 39, and the like. The receiving operation according to the embodiments may refer to a process in which a reception device (client) queries (requests) a server and/or a provider for required information and receives response information, as shown in FIG. 32. The request/response process is performed according to each interface in FIG. 32. A device performing the receiving operation according to the embodiments is shown in FIG. 33 and the like.

S9501: The method of receiving media data according to the embodiments may include controlling a service list. Based on the signaling information and flowcharts as shown in FIGS. 5 to 7, the reception method and reception device according to the embodiments may provide processing of a hidden channel. Referring to FIG. 10, the reception method and reception device according to the embodiments may provide guide information about the media data (services) and may provide an indication of whether a service is received through a UI/UX. The service list information may include the information in FIGS. 11 to 17. Based on this information, the method/device according to the embodiments may display service instances, delivery types, and resolution through the UIUX, as shown in FIG. 18. Further, in order to provide a service list logo to a user on the client side, relevant information and data is required. In the process of the client transmitting a query to the registry and receiving a response, the logo image may be delivered as an encoded image to enhance efficiency. Further, image path information may be provided. Depending on client performance, the path may be acquired or the encoded image may be received as XML. To this end, combining filtering query strings may be supported.

A DVB-I service list registry (SLR) according to embodiments is an HTTP endpoint available at a known URL that, when queried, may return a list of service list entry points. A DVB-I service list provider that intends to enable the SLR search mechanism for its service list may register service list entry points with the SLR using the M interface in FIG. 11. The SLR also collects the contact information about the service list provider. The SLR may respond to the query issued by the DVB-I client.

All provided query parameters use the character set described in Annex C of ETSI TS 102 809. In addition, "reserved" characters, as defined in section 2.2 of IETF RFC 3986, in the query string (within a key/value pair) are percent-encoded as defined in IETF RFC 3986 before being submitted as follows Query parameter whitespace may be either percent-encoded (e.g., "%20") or the plus sign "+".

The maximum length of a normalized web service URL, including parameters, cannot exceed 2,048 characters. URLs that exceed this length do not need to be configured to access the service list provided by the SLR.

Queries may be executed with or without query parameters. The query parameters may utilize the DVB-I client's knowledge of the user's geographic location or preferences. When multiple values are allowed for a query parameter, the values are provided through iterative parameters with "square brackets" notation to indicate that they are array variables. The values are sorted alphabetically or numerically in ascending order. Square brackets "[" and "]" within URLs enable efficient syntax analysis by the service list registry. The square brackets "[" and "]" are percent-encoded as defined in section 2.1 of IETF RFC 3986.

Multiple values for the same parameter are interpreted by the SLR using the OR logical operator as an alternative. For example, if a query contains two values of the TargetCountry parameter for Country A and Country B, the service list offering is included in the following results. Specify Country A with TargetCountry. Specify Country B with TargetCountry. Specify Country A and Country B with TargetCountry. Do not specify TargetCountry.

If a specific parameter is not included in the query, the SLR does not apply filtering based on the parameter. Accordingly, the result includes service list offering that does or does not specify the value for the parameter. For example, if the TargetCountry parameter is not included in the query, the result includes service list offering that either specifies TargetCountry or does not include the TargetCountry element. The query string is included as part of the URL: <ServiceListRegistryEndpoint>?<parameter1>=value1& <parameter2>=value2, where <ServiceListRegistryEndpoint> contains only the scheme, authorization, and path syntax components of the URL defined in sections 3.1, 3.2, and 3.3 of IETF RFC 3986. The following query parameters can be used, but shall be used in order in which they are presented: TargetCountry, RegulatorListFlag, Delivery, Language, Genre, ProviderName, and inlineImages.

The &inlineImages parameter takes a boolean value indicating whether the response should include graphical elements formatted according to IETF RFC 2397. If not provided, the service list registry assumes the value to be false and only the HTTP URLs for the graphical elements may be provided in response.

Referring to FIGS. 1 to 3 and 11, regarding the service list, a method according to embodiments may include generating media data; generating a service list related to the media data; and transmitting the media data and the service list based on a network.

Referring to FIG. 3, regarding the protocol stack, in order to discover DVB-C/S/T/I services, the network according to the embodiments may include the Internet. The network may further include at least one of terrestrial, satellite, or cable.

Referring to FIG. 32, regarding the list of lists, the service list may be accessed by entry points for discovery, wherein the service list may include a plurality of service lists for multiple service list servers.

Referring to FIGS. 1 to 3 and 11, regarding the service list acquisition, a method of processing media data according to embodiments may include at a transmitting side, generating media data, generating a service list related to the media data, and transmitting the media data and the service list based on a network.

Referring to FIG. 3, regarding the protocol stack and DVB-C/S/T/I service and discovery, the network may include the Internet. The network may further include at least one of terrestrial, satellite wave, or cable.

Referring to FIG. 32, regarding the list of lists, which is a set of lists according to embodiments, the service list may be accessed by entry points for discovery, wherein the service list may include a plurality of service lists for multiple service list servers.

Referring to FIG. 23, regarding the ServiceListOfferingType, RelatedMaterial, MediaLocator, and InlineMedia, the method of processing media data according to the embodiments may further include, in response to a request from a client, transmitting a service list entry point to the client, wherein the service list entry point may include service list offering (ServiceListOfferingType), the ServiceListOfferingType including a related material (RelatedMaterial), wherein the RelatedMaterial may include a media locator (MediaLocator), wherein the MediaLocator may include at least one of MediaUri or InlineMedia.

The service list entry point is a point for a service list and carries information about a service list entry entity, a provider, and the like. The ServiceListOfferingType contains information about the service list name, service list uri, delivery method, language, genre, target country, and related material. The RelatedMaterial is an additional material related to the service related to the service list offering. For example, it may be a service list logo. The MediaLocator is an element that contains a uri for an image file. The InlineMedia, which may also be referred to as an inline image, represents a graphical element, an encoded image, or media.

Referring to FIG. 24, regarding a service list registry request, the method of processing media data according to the embodiments may further include receiving, from the client, a query requesting a service list registry, wherein the query may include information about the InlineMedia, wherein, in response to the query, an image related to the InlineMedia may be transmitted to the client.

The method of processing media data according to the embodiments may be performed by a media data processing device. Referring to FIG. 32, the media data processing device may include, on the transmitting side, a content guide server, a service list server, a service list registry, a playlist server, a content/service provider, an MPD server, and a stream server. Further, it may include a provider configured to generate media data, and a server configured to generate a service list related to the media data, wherein the media data and the service list may be transmitted based on a network. It may include a memory storing instructions and a processor configured to perform media data processing according to the instructions.

Referring to FIG. 32, regarding the service list registry according to the embodiments, the media data processing device may further include a service list registry configured to deliver a service list entry point in response to a request from a client.

As a reverse process to the media data processing method on the transmitting side, the media data processing method on the receiving side may include processing a service discovery and receive media data. For example, the media data processing method may include, receiving, based on a network, media data and a service list related to the media data, and processing the media data based on the service list.

Referring to FIGS. 11 and 23, the media data processing method may further include making a request to a service list registry for a service list entry point, wherein the service list entry point may include service list offering (ServiceList-OfferingType), the ServiceListOfferingType including a related material (RelatedMaterial), wherein the RelatedMaterial may include a MediaLocator, wherein the MediaLocator may include at least one of MediaUri or InlineMedia.

Referring to FIG. 24, in the media data processing method, the making the request to the service list registry for the service list entry point may be performed based on a query, wherein the query may include information about the InlineMedia, wherein, in response to the query, an image related to the InlineMedia may be transmitted to the client.

based on the information about the InlineMedia having a first value (set), the first value may indicate that an image for a service list logo is receivable by the client in an Extensible Markup Language (XML) format, wherein, based on the information about the InlineMedia having a second value (false), the second value may indicate that a request is made for a path along which the image for the service list logo is acquirable by the client. In the case of the first value, the image for the logo is delivered in the in-band encoded media data.

The media data processing method may further include, in response to the first value, decoding the image received in the XML format and providing an image for selection of a service list, and in response to the second value, acquiring the image based on the path.

The media data processing method on the client side is performed by a media data processing device. The media data processing device may include a receiver configured to receive, based on a network, media data and a service list related to the media data, and a processor configured to process the media data based on the service list. The processor makes a request to a service list registry for a service list entry point, wherein the service list entry point includes service list offering (ServiceListOfferingType), the ServiceListOfferingType including a related material (RelatedMaterial). The RelatedMaterial includes a MediaLocator, and the MediaLocator includes at least one of MediaUri or InlineMedia.

Accordingly, an issue raised as the UI/UX of the DVB-I client is not taken into account in XML provisioning, which leads to a large size of XML may be addressed, and loss may be effectively eliminated in terms of DVB-I client memory optimization. In other words, the client may be allowed to perform filtering by the combination of <ServiceListRegistryEndpoint> and query string as a method to access the Service List registry. For a region that does not need to be displayed in consideration of the UI/UX of the DVB-I client, this determination of the value of InlineMedia may include an external resource link as in conventional cases. If the DVB-I client determines the number of images for the initial screen or the required region and requests InlineMedia, unnecessary memory consumption may be reduced and the same quality of screen configuration may be achieved without any issues with the existing screen configuration.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications may be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/"and"," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in the present disclosure may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

MODE FOR DISCLOSURE

Various embodiments have been described in the best mode for carrying out the invention.

INDUSTRIAL APPLICABILITY

It will be apparent to those skilled in the art that various changes or modifications can be made to the embodiments within the scope of the embodiments. Thus, it is intended that the embodiments cover the modifications and variations of this disclosure provided they come within the scope of the appended claims and their equivalents.

The invention claimed is:

1. A method of processing media data, the method comprising:
   - generating media data;
   - generating a service list related to the media data;
   - receiving a request from a client;
   - transmitting a service list entry point to the client in response to the request;
   - transmitting the service list based on a network,
   - wherein the service list entry point includes a service list offering (ServiceListOffering Type),
   - wherein the ServiceListOffering Type includes a related material (RelatedMaterial),
   - wherein the RelatedMaterial includes a media locator (MediaLocator), and
   - wherein the MediaLocator includes a media URI (MediaUri) containing encoded image data,
   - wherein the request includes an inline image parameter for representing graphical elements.

2. The method of claim 1, wherein the network comprises Internet,
   - wherein the network further comprises at least one of terrestrial, satellite, or cable.

3. The method of claim 2, wherein the service list is accessed by entry points for discovery,
   - wherein the service list comprises a plurality of service lists for multiple service list servers.

4. The method of claim 1, further comprising:
   - receiving, from the client, a query requesting a service list registry,
   - wherein the query comprises information about InlineMedia,
   - wherein, in response to the query, an image related to the InlineMedia is transmitted to the client.

5. A media data processing device comprising:
   - a memory; and
   - a processor connected to the memory, the processor configured to:
   - generate media data; and
   - generate a service list related to the media data,
   - receive a request from a client;
   - transmit a service list entry point to the client in response to the request;
   - transmit the service list based on a network,
   - wherein the service list entry point includes a service list offering (ServiceListOfferingType),
   - wherein the ServiceListOffering Type includes a related material (RelatedMaterial),
   - wherein the RelatedMaterial includes a media locator (MediaLocator), and
   - wherein the MediaLocator includes a media URI (MediaUri) containing encoded image data,
   - wherein the request includes an inline image parameter for representing graphical elements.

6. The device of claim 5, further comprising:
   - a service list registry configured to deliver a service list entry point in response to a request from a client.

7. A method of processing media data, the method comprising:
   - transmitting a request to a server;
   - receiving a service list entry point from the server in response to the request;
   - receiving, based on a network, a service list related to the media data; and discovering the media data based on the service list, wherein the service list entry point includes a service list offering (ServiceListOffering Type), wherein the ServiceListOfferingType includes a related material (RelatedMaterial), wherein the RelatedMaterial includes a media locator (MediaLocator), and wherein the MediaLocator includes a media URI (MediaUri) containing encoded image data, wherein the request includes an inline image parameter for representing graphical elements.

8. The method of claim 7, wherein the request includes information about InlineMedia, wherein, in response to the request, an image related to the InlineMedia is transmitted to the client.

9. The method of claim 8, wherein, based on the information about the InlineMedia having a first value, the first value indicates that an image for a service list logo is receivable by the client in an Extensible Markup Language (XML) format, wherein, based on the information about the InlineMedia having a second value, the second value indicates that a request is made for a path along which the image for the service list logo is acquirable by the client.

10. The method of claim 9, further comprising:

in response to the first value, decoding the image received in the XML format and providing an image for selection of a service list; and in response to the second value, acquiring the image based on the path.

11. A media data processing device comprising:

a memory; and a processor connected to the memory, the processor configured to:

transmit a request to a server;

receive a service list entry point from the server in response to the request;

receive, based on a network, a service list related to media data; and discover the media data based on the service list, wherein the service list entry point includes a service list offering (ServiceListOffering Type), wherein the ServiceListOffering Type includes a related material (RelatedMaterial), wherein the RelatedMaterial includes a media locator (MediaLocator), and wherein the MediaLocator includes a media URI (MediaUri) containing encoded image data, wherein the request includes an inline image parameter for representing graphical elements.

* * * * *